United States Patent [19]
Brunts et al.

US005887269A
[11] Patent Number: 5,887,269
[45] Date of Patent: Mar. 23, 1999

[54] DATA PRODUCT AUTHORIZATION CONTROL FOR GPS NAVIGATION SYSTEM

[75] Inventors: Randall T. Brunts, Carmel; Douglas Lynn Welk, Rossville, both of Ind.

[73] Assignee: Delco Elecronics Corporation, Kokomo, Ind.

[21] Appl. No.: 586,127

[22] Filed: Jan. 16, 1996

Related U.S. Application Data

[63] Continuation-in-part of Ser. No. 533,902, Sep. 26, 1995, abandoned, which is a continuation-in-part of Ser. No. 418,809, Apr. 7, 1995, abandoned.

[51] Int. Cl.⁶ .................................................. G06F 165/00
[52] U.S. Cl. ............................ 701/208; 701/213; 340/990; 340/995
[58] Field of Search .................................... 701/200, 202, 701/207, 208, 209, 213, 1; 73/178 R; 340/988, 990, 995, 825.34; 380/9, 23, 25

[56] References Cited

U.S. PATENT DOCUMENTS

| | | |
|---|---|---|
| 4,367,453 | 1/1983 | Kuno et al. . |
| 4,642,775 | 2/1987 | Cline et al. . |
| 4,646,089 | 2/1987 | Takanabe et al. . |
| 4,677,563 | 6/1987 | Itoh et al. . |
| 4,737,927 | 4/1988 | Hanabusa et al. . |
| 4,758,959 | 7/1988 | Thoone et al. . |
| 4,814,989 | 3/1989 | Döbereiner et al. . |
| 4,853,859 | 8/1989 | Morita et al. . |
| 4,890,233 | 12/1989 | Ando et al. . |
| 4,951,211 | 8/1990 | De Villeroche . |
| 4,954,959 | 9/1990 | Moroto et al. . |
| 4,992,947 | 2/1991 | Nimura et al. . |
| 5,014,098 | 5/1991 | Schlais et al. ........................ 357/23.5 |
| 5,072,395 | 12/1991 | Bliss et al. . |
| 5,146,231 | 9/1992 | Ghaem et al. . |
| 5,159,556 | 10/1992 | Schorter . |
| 5,184,303 | 2/1993 | Link . |
| 5,191,532 | 3/1993 | Moroto et al. . |
| 5,231,584 | 7/1993 | Nimura et al. . |
| 5,247,575 | 9/1993 | Sprague et al. ............................ 380/9 |
| 5,257,195 | 10/1993 | Hirata . |
| 5,270,936 | 12/1993 | Fukushima et al. . |
| 5,278,759 | 1/1994 | Berra et al. . |
| 5,293,513 | 3/1994 | Umezo et al. . |
| 5,303,393 | 4/1994 | Noreen et al. . |
| 5,337,244 | 8/1994 | Nobe et al. . |
| 5,343,399 | 8/1994 | Yokoyama et al. . |

(List continued on next page.)

OTHER PUBLICATIONS

"Benz Sat–Nav," Autoweek, Oct. 3, 1994.
"The Honda Way," Autoweek, Oct. 10, 1994.

Primary Examiner—Gary Chin
Attorney, Agent, or Firm—Jimmy L. Funke

[57] ABSTRACT

A navigation system is provided for offering navigational assistance to a mobile user. The navigation system receives GPS position information signals which are processed to determine current position latitude and longitude coordinates and direction of travel. A destination data base includes destination related information preferably stored on an interfacable memory card and contains menu categories and subcategories for classifying destinations and text information. The memory card may include a user modifiable data base. Data information is provided with a data identification code which is required to match the user identification code assigned to a given system for authorized access thereto. Such data could be provided for a period of time set to expire. User selectable menu controls enable the user to sequence through the menu of categories and destinations and select a desired destination. A processor compares the current position coordinates with the position coordinates of the selected destination and determines a distance and a straight-line direction from the current position to the selected destination. A display displays the distance and a direction pointing indicator for showing the direction from the current position to the selected destination. In one embodiment, the navigation system is integrated with an audio entertainment system and shares a common display and housing.

10 Claims, 21 Drawing Sheets

U.S. PATENT DOCUMENTS

| | | |
|---|---|---|
| 5,345,388 | 9/1994 | Kashiwazaki . |
| 5,353,034 | 10/1994 | Sato et al. . |
| 5,359,527 | 10/1994 | Takanabe et al. . |
| 5,394,333 | 2/1995 | Kao . |
| 5,398,189 | 3/1995 | Inoue et al. . |
| 5,412,573 | 5/1995 | Barnea et al. . |
| 5,430,653 | 7/1995 | Inoue . |
| 5,442,557 | 8/1995 | Kaneko . |
| 5,452,212 | 9/1995 | Yokoyama et al. . |
| 5,452,217 | 9/1995 | Kishi et al. . |
| 5,459,667 | 10/1995 | Odagaki et al. . |
| 5,486,822 | 1/1996 | Tenmoku et al. . |
| 5,515,284 | 5/1996 | Abe . |
| 5,629,981 | 5/1997 | Nerlikar ..................................... 380/25 |

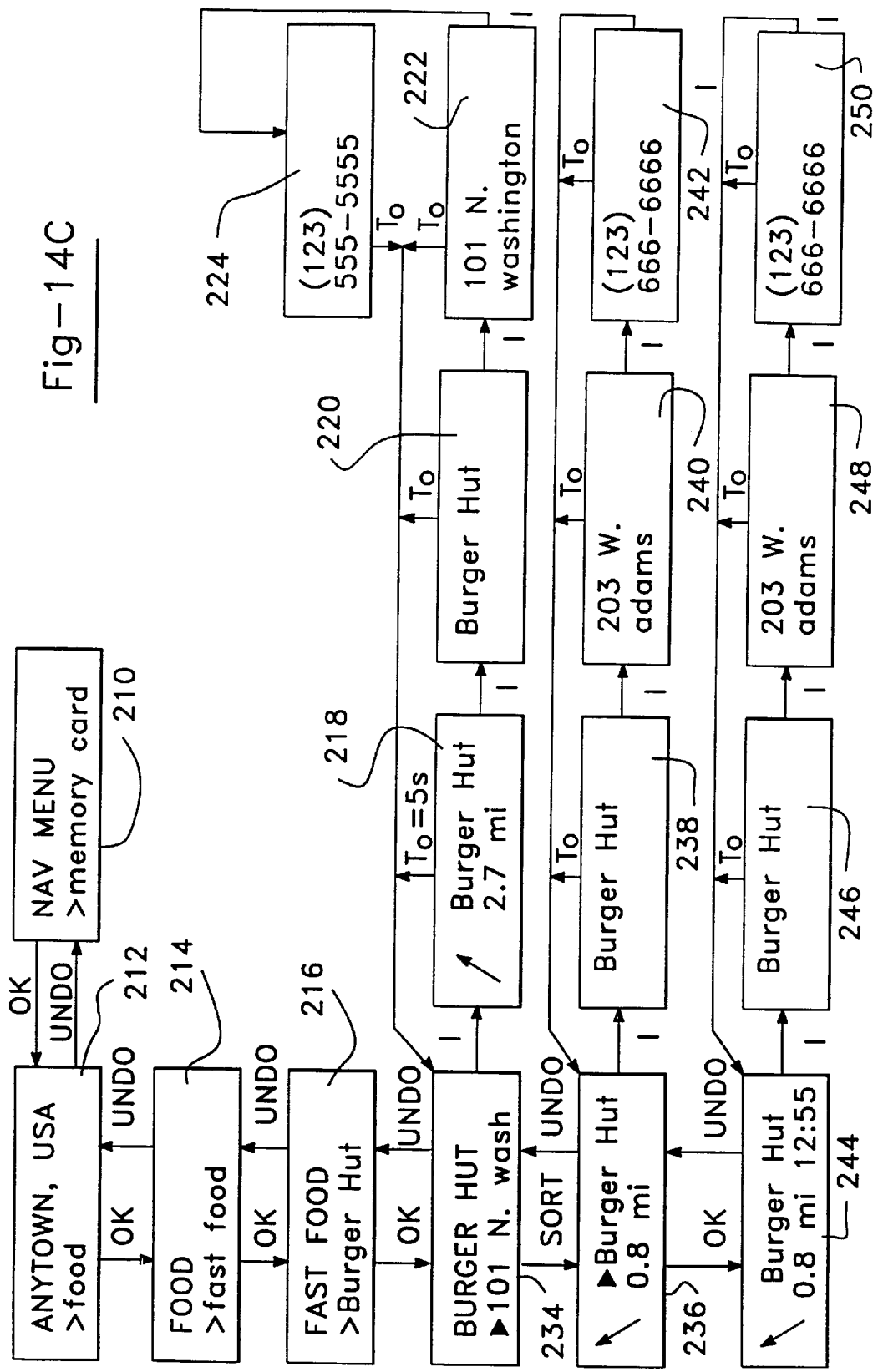

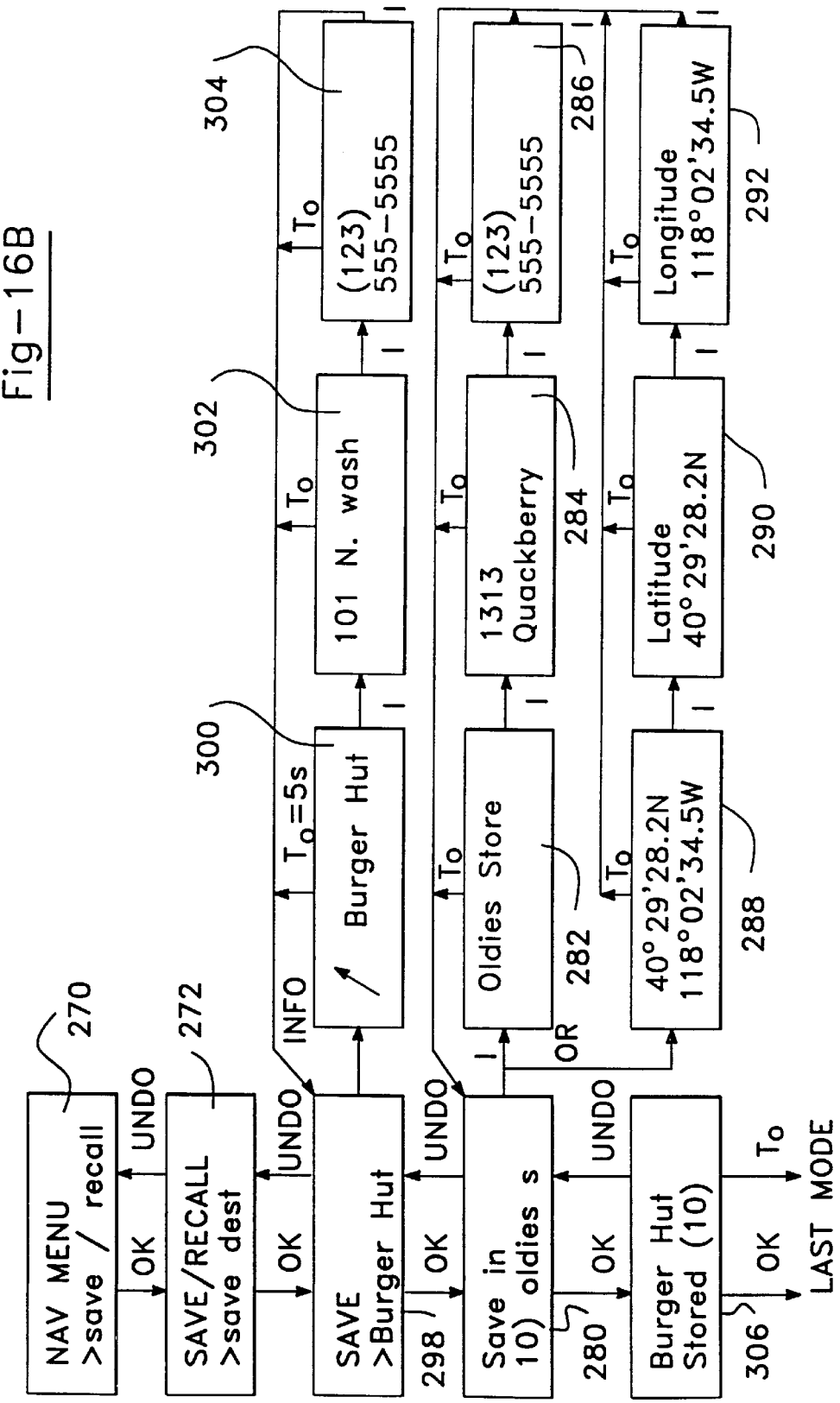

DATA PRODUCT AUTHORIZATION CONTROL FOR GPS NAVIGATION SYSTEM

CROSS-REFERENCE TO RELATED APPLICATIONS

This is a continuation-in-part of U.S. patent application Ser. No. 08/533,902, filed Sep. 26, 1995, entitled "USER MODIFIABLE REPLACEABLE MEMORY CARD FOR GPS NAVIGATION SYSTEM"now abandoned, which is a continuation-in-part of U.S. patent application Ser. No. 08/418,809, filed Apr. 7, 1995, entitled "PCMCIA CARDS AS REPLACEABLE MEMORY IN GPS NAVIGATION SYSTEM", now abandoned.

BACKGROUND OF THE INVENTION

1. Technical Field

This invention relates generally to navigation systems and, more particularly, to an easy to use low cost GPS navigation system employing readable memory cards containing destination data base information and data access control for allowing access to authorized data and denying access to unauthorized data.

2. Discussion

The concepts of intelligent vehicle highway systems (IVHS) are changing the future of ground transportation systems. In particular, navigation systems have been developed and are increasingly becoming available for use in assisting a mobile user. For example, on-board navigation systems are currently provided in some automotive vehicles to assist the driver of the vehicle in navigating the vehicle along a route or roadway system to reach a desired destination.

Early navigation systems generally did not have the availability of advanced positioning systems such as global positioning system (GPS). Instead, a number of early navigation systems often relied exclusively on dead reckoning techniques to account for a moving vehicle's location. Generally speaking, dead reckoning is the determination of position by advancing a known position using measured courses and distances. This generally involved determining a starting location and manually setting the vehicle's position on an electronic map. With the use of a dead reckoning technique, an approximate path of travel of the vehicle could be computed and updated as the vehicle was driven. The travel path determination was often achieved by way of a compass reading and vehicle speed information or was achieved by some other kind of dead reckoning technique. However, many of the dead reckoning based navigation systems often failed to provide accurate and continuous navigation assistance and therefore required repeated corrections to the vehicle's computed position.

The development of the global positioning system (GPS) by the United States Department of Defense has greatly enhanced the ability to navigate. Currently, a constellation of satellites are in place orbiting the earth at high altitudes and transmitting radio waves which contain position information. With the use of GPS receivers, the position information can be received and used to calculate the current latitude and longitude position coordinates at the receiving location. The global positioning system is currently achieving recognition as the superior position locator system for providing accurate worldwide fixes.

With the widespread availability of GPS, more recent navigation systems now rely on GPS to provide position information to compute a vehicle's position. According to one approach, the computed position of the vehicle is contrasted to a digitized map. This technique, also known as map matching, requires a complex digitized map data base and normally uses an expensive full function detailed map display to show the digitized map in relation to the vehicle's position. The digitized map data base has to consider one-way street information, turn restrictions and other roadway requirements. Often with the use of a complex algorithm, a computer would attempt to compute a best route from the vehicle's current position to a desired destination, considering all available street changes and travel restrictions. This results in turn-by-turn instructions in which a driver is instructed to turn left or right or proceed straight ahead on each approaching street.

The use of map matching navigation and other similar full function navigation systems has generally provided a user with the ability to follow calculated turn-by-turn instructions as computed by the navigation system. However, map matching techniques generally do not take into consideration changes in travel routes and roadway restrictions. That is, changes in a transportation system which often occur, especially on roads subjected to road construction, remain unaccounted for. Also, some drivers may feel that the expensive full function displays may tend to cause the driver to rely too heavily on the map display for driving instructions rather than for mere assistance. They therefore may feel that such displays are too distractive. Furthermore, most full function navigation systems are commercially available at a very high cost which often makes the systems unaffordable to a vast majority of consumers.

Additionally, some conventional GPS navigation systems do not offer continual flexibility and large data bases to select from a very large number of destinations. Instead, a number of systems contain predetermined destination information stored entirely within the navigation system. The user is generally limited to the prestored destination information. While some navigation systems do contain removable data bases, the removable data bases are often not easily accessible by a driver. It is desirable to provide for a more flexible destination data base which may easily accommodate the needs of users in different territories.

Also, commercially available GPS navigation systems provide destination data bases with preselected destination information which the manufacturer anticipates will be useful for the user. These destination data bases generally do not provide the user with the capability to modify destination information to one's personal liking. Modifiable destination information may advantageously allow a user to customize the navigation system for use in a given geographic territory. For example, the user may find it helpful to reprogram a destination data base so as to update the information which may change over time. That is, new businesses may open or close or change location, phone numbers and price information may change, amongst other types of information that may have to be changed on the destination data base. Users may have special preferences for certain types of restaurants, hotels, etc., or may wish to pre-plan routes with waypoint and turn information for later use.

Furthermore, navigation systems, as well as other service-related products, often require large amounts of stored information. For navigation purposes, this information may include compiled data generally pertaining to possible destinations or roadway information. The collection, organization, programming and maintenance of current information for data information such as this is generally expensive and time consuming. Often, the data is made available and licensed on a per copy basis to individual users or to organizations for a particular purpose or made available on some other basis. In order to prevent widespread unauthorized data copying and subsequent commercial exploitation (e.g., piracy) and ensure valid data information is available to the user, the data provider must take steps necessary to encrypt or otherwise protect the information.

It is therefore desirable to provide a low cost and easy-to-use navigation system which offers navigational assistance to a mobile user for traveling to desired destinations.

More particularly, it is desirable to provide a navigation system that employs global positioning system signals and a flexible destination data base on an interchangeable memory card in a manner which is affordable to many users.

It is further desirable to provide such a navigation system which may easily be installed in an automotive vehicle and different memory cards may be used in assisting the driver of the vehicle to reach a desired destination.

Yet, it is also desirable to provide such a navigation system which further offers many categorized destinations and provides detailed information about the destinations for predefined areas of service coverage.

Additionally, it is desirable to provide for a system and method for accessing authorized data information, such as information made available to navigation system users, so as to protect against widespread unauthorized copying and pirating of the data.

Also, it is desirable to provide for such a system and method which allows a user to access authorized consumer data information that is made available with a purchase or rental agreement.

Furthermore, it is desirable to provide for such a system and method for accessing navigation-related data information, while allowing a user to create and use personal data information.

SUMMARY OF THE INVENTION

In accordance with the teachings of the present invention, a system and method are provided for allowing access to authorized data information for use in a data access system. The invention is particularly suited for use with a navigation system for offering navigational assistance to a mobile user. Data information, such as destination-related information for navigational services, could be made available to a user with an authorization code encrypted within the data. Available reading devices, such as navigation systems, are assigned authorization identification codes, from a large pool of possible codes, preferably so that each system has its own identification number. The data information is provided to a user so that the data has a data identification code which coincides with the identification code for his or her reading device. Additionally, a user could create a data card authorized for a given reading device by using the corresponding authorization identification code.

According to a preferred use with the navigation system, a precision sensing receiver is available for receiving GPS position information signals. The position information signals are processed to determine current position coordinates and also make available the time of day and day of year (date) information. The navigation system retrieves the destination information only when the authorization identification code is accepted by the particular navigation system in use. According to a preferred embodiment, the destination information is stored on a memory card that may be easily inserted into and accessed by a memory card interface. The memory card may include standard connectors and may be connected to a personal computer and remotely accessed, and even programmable, if desired. Preferably, a plurality of memory cards are available to choose from, each card providing destinations within a defined geographic area of coverage. User selectable menu controls are provided to sequence through and select a destination and text information. A processor receives the position information and a selected destination and determines a straight-line direction and distance from the current position to the selected destination. The navigation system further includes a direction pointing indicator for providing a visual straight-line indication of the direction from the current position to the selected destination.

The data information may further be accessed in accordance with a rental arrangement whereby a user may retrieve information from a CD-ROM, On-Line information service or other data service provider. This rental information arrangement may include an expiration date whereby the retrieved data information is accessible for a limited period of time. Accordingly, a user accesses the information until expiration of the limited time and/or date as determined via the position sensing receiver. This is possible because date and time are available from the GPS receiver as a byproduct of computing receiver position independently of local date and time sources.

BRIEF DESCRIPTION OF THE DRAWINGS

Other objects and advantages of the present invention will become apparent to those skilled in the art upon reading the following detailed description and upon reference to the drawings in which:

FIGS. 14A through 14C illustrate a sequencing of menu selections and displays when selecting a destination and destination information from the memory card destination data base; FIG. 14A shows selection of a fast food destination;

FIG. 14B further shows selection of a fast food destination from a group of same name destinations; and FIG. 14C illustrates the menu selection sequencing and displays with a sort by distance operation;

FIGS. 16A through 16E illustrate sequencing of menu selections and displays when saving and recalling stored destinations and information in a user programmable memory when in the save/recall menu mode; FIG. 16A illustrates saving the current position as a destination; FIG. 16B illustrates saving the last selected data base destination; FIG. 16C illustrates saving a destination from the latitude/longitude menu mode; FIG. 16D illustrates recalling user stored destinations which were stored from the data base; and FIG. 16E illustrates recalling user stored destinations which were stored as latitude/longitude position coordinates.

DETAILED DESCRIPTION OF THE PREFERRED EMBODIMENTS

Figure 2:
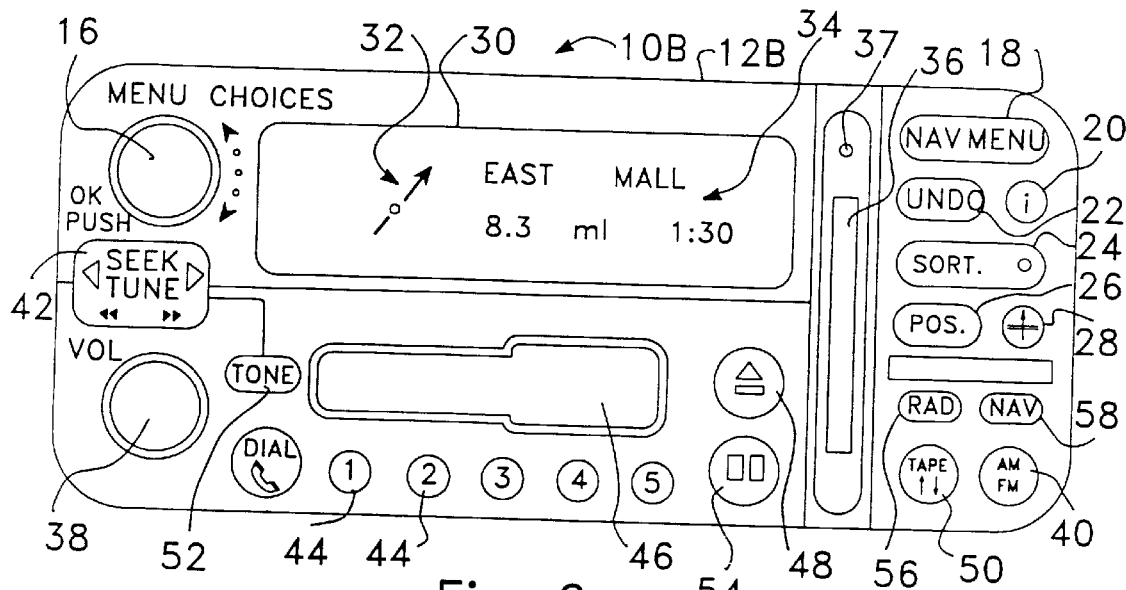
FIG. 2 is a front view of the navigation system integrated with an audio entertainment system in accordance with another embodiment of the present invention.
Figure 1:
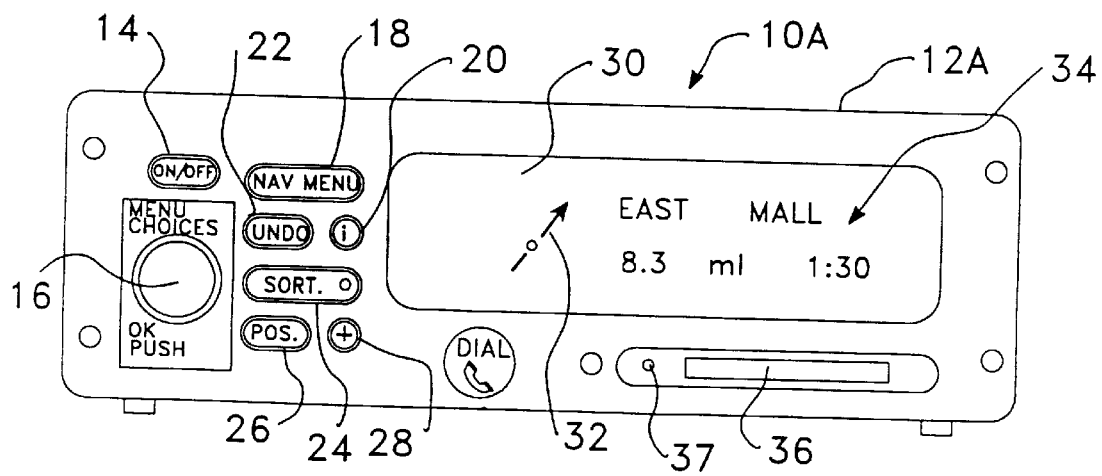
FIG. 1 is a front view of a navigation system packaged by itself according to one embodiment of the present invention.

Turning now to FIGS. 1 and 2, a mapless navigation system is shown according to two embodiments 10A and 10B of the present invention for providing navigation services. The navigation system 10A of FIG. 1 is configured as a stand-alone navigation unit. The navigation system 10B of FIG. 2 is integrated into an audio entertainment system of the type generally configured for installation in an automotive vehicle. Both embodiments of the navigation system 10A and 10B contain similar navigation related components and provide the same or substantially similar navigation services.

Accordingly, the navigation system is often generally referred to herein as reference numeral 10. Like components in both system embodiments of 10A and 10B share like reference numerals.

Referring particularly to FIG. 1, the stand-alone navigation system 10A has a face plate 12A assembled on the front side of a generally rectangular housing. The housing may include two side mount brackets (not shown) integral to housing and a rear mounted stud (also not shown) for mounting to a supportive structure. For automotive vehicle use, the housing is preferably mounted or integrated within the instrument panel (IP) of an automotive vehicle in a manner similar to the mounting of a car radio. However, the standalone navigation system 10A could be employed as a portable hand-held navigation unit and used for a wide variety of navigational applications.

Extending from the face plate 12A of navigation system 10A are several manually selectable controls for controlling various navigational functions. Included is an "ON/OFF" pushbutton control 14, a "MENU CHOICES" rotary/pushbutton control 16, a navigation menu selection "NAV MENU" pushbutton 18, an "UNDO" selection pushbutton 22, an information "I" pushbutton 20, a sort by distance "SORT" pushbutton 24, a current position "POS" pushbutton 26 and a direction heading pushbutton 28.

The navigation menu selection pushbutton 18, when manually depressed, displays the navigation main menu. The navigation main menu contains three navigation menus, namely, a destination menu, a latitude/longitude menu, and a save/recall menu. The menu choices rotary/pushbutton 16 is rotatable to switch between various selections of a selected navigation menu and depressible to select the option that is currently displayed. The undo pushbutton 22 will undo the last selection and return to the previous selection. Repeatedly pressing the undo pushbutton 22 will continue to undo the previous selections until the display 30 returns to the main navigation menu. The information pushbutton 20 will retrieve alphanumeric text information pertaining to a selected destination. The sort by distance pushbutton 24 initiates a sorting function for sorting destinations based on distance from a particular location. The position pushbutton 26 displays the current latitude and longitude position coordinates, while direction heading pushbutton 28 provides the current vehicle direction heading.

The navigation system 10A includes a navigation guidance display 30 for displaying a direction pointing arrow 32 and alphanumeric text 34. The direction pointing arrow 32 points in the straight-line direction toward a selected destination. The alphanumeric text 34 may include various destination names, distances, menu selection names, latitude and longitude position coordinates, current direction heading readings, time of day and other alphanumeric text information. After a specific destination is selected, the text information 34 may include the name of the selected destination and the straight-line distance from the current position of the navigation system 10A to the selected destination. The direction pointing arrow 32 and distance readings are continually updated in response to sensed GPS signals and can be maintained when GPS is unavailable with the use of a backup dead reckoning technique.

Because the number of predetermined destinations can be enormous, we prefer to group selected types of destinations into separate data bases and to store each data base on a separate readable memory card. Hence, only small data bases need be used. This feature of the invention permits use of a wide variety in types of destination groupings, as will hereinafter be explained. The memory card is about the size of a credit-card and is preferably formatted to PCMCIA standards. Use of PCMCIA standard connections to the card not only help maintain low cost but also provides other advantages which also will hereinafter be explained.

To accommodate a large number of destinations, a plurality of memory cards are made available to select from.

Each memory card would contain a selected type of data base as for example a camping information directory, a business directory, a restaurant/hotel directory, etc. for covering a given geographic area. Each memory card provides categorized destinations with corresponding latitude and longitude position coordinates within a predefined territory and also includes alphanumeric text information pertaining to each of the destinations. For example, a business directory data base may provide business names, address locations, phone numbers and business operating hours, as well as other types of information.

To access the destination information, the navigation system 10A is equipped with a memory card interface 36. With the appropriate memory card inserted in memory card interface 36, thousands of destinations are available for exploration. Since the PCMCIA memory cards are relatively small and of a standard interface type, their cost is minimized. Also, the PCMCIA memory card is small enough to allow one to carry a plurality of cards in a vehicle without an undue burden. Still further, the PCMCIA memory card could be readable by an ordinary computer having a compatible program, and thus giving it an alternate use for accessing information on computers which are compatible with the PCMCIA standard memory card.

Businesses with many outlets, offices or affiliates may find it economically worthwhile to compile data bases that include and/or favor themselves, and to distribute such data bases on PCMCIA memory cards to potential customers at no or low cost. For example, a golf organization may find it advantageous to distribute PCMCIA memory cards equipped with a desired data base to its members and potential members or customers. Such a marketing strategy will enable the card holder to navigate to destinations affiliated with the organization.

Still further, the memory card could be made with programmable memory that is inherently non-volatile or that has a battery back-up on the card. Such a memory card is usually more expensive but would offer added flexibility in programming. A user could therefore save destination-related information on such a programmable memory card. As will be described hereinafter in connection with the present invention, one could program such a programmable memory card with selected destinations on one's personal computer and then use the user programmed memory card in a navigation system such as that described herein. Accordingly, use of the PCMCIA memory card for replaceable memory in this invention opens up a myriad of possibilities for types of data bases that might be stored on them for use in the navigation system 10 of this invention.

The memory card interface 36 operates as a data reader to access and read information stored on the inserted memory card when data information access is authorized. According to the present invention, the stored data information provided on a given memory card is encrypted and contains a user data identification code such as a sequence of identification numbers, alphanumeric or symbolic characters or combination thereof. Similarly, each navigation system contains one of a plurality of navigation identification codes that is required to match with the data identification code of the data information in order to allow access to the data. The memory card interface 36 further includes an access display light 37 which energizes a red light when data access is not authorized and energizes a green light when data access is authorized, thereby indicating to the user whether or not access to the information is available.

With particular reference to FIG. 2, the navigation system 10B is integrally packaged with an audio entertainment system and contains substantially the same navigation components and features provided in the stand-alone navigation system 10A. The navigation/audio entertainment system 10B has a face plate 12B which likewise includes the "MENU CHOICES" rotary/pushbutton 16, navigation menu "NAV MENU" pushbutton 18, information "I" pushbutton 20, "UNDO" pushbutton 22, sort by distance "SORT" pushbutton 24, position "POS" pushbutton 26 and current direction heading pushbutton 28. The integrated navigation/audio entertainment system 10B similarly has a guidance display 30 that is commonly shared among the navigation, audio radio and audio cassette tape modes of operation. That is, display 30 will provide the direction indicating arrow 32 with the destination information 34 when in the navigation display mode. However, display 30, when in the audio radio display mode, will generally display AM or FM frequency selections in addition to the time of day and various types of radio related information. When in the audio cassette tape display mode, the display 30 will display information pertaining to the cassette tape operation.

The integrated navigation/audio entertainment system 10B is shown also containing various audio radio and cassette tape controls. More particularly, an AM/FM frequency band selection control pushbutton 40 toggles between the AM and FM radio frequency bands. A momentary pushbutton rocker switch 42 provides pushbutton frequency tuning selection and radio frequency seek control. In cooperation with "TONE" pushbutton switch 52, control switch 42 enables selection of various audio sound parameters such as treble, bass, fade, balance and auto volume settings. Five user programmable station preset pushbuttons 44 are available for storing and recalling programmed radio frequency selections from electronically erasable programmable memory (EEPROM). Each of the five pushbuttons 44 may access at least three memory locations which, in a radio receiver mode, stores one AM selection frequency and two FM frequency selections.

The integrated navigation/audio entertainment system 10B as shown in FIG. 2 also includes an audio cassette tape player 46. The cassette tape player 46 receives and reads stored audio information on an audio cassette tape (not shown) as is well known in the art. Audio cassette tape player 46 has function controls which include a tape eject pushbutton 48 and a side selector pushbutton 50 for selecting between the first and second sides of an audio cassette tape.

While the preferred embodiment of the navigation/audio entertainment system 10B includes an AM/FM radio and audio cassette tape player integrated with the navigation system ir FIG. 2, it should be appreciated that other audio entertainment systems or combinations of audio systems may be combined with the navigation system. For example, an audio compact disc (CD) player could be employed in addition to or in place of the audio cassette tape player 46. Alternately, an externally located compact disc (CD) changer could be electrically coupled to the radio tuner and operated in conjunction with the radio. It is also conceivable that destination-related information could be stored on and retrieved from a compact disc or cassette.

Figure 3:
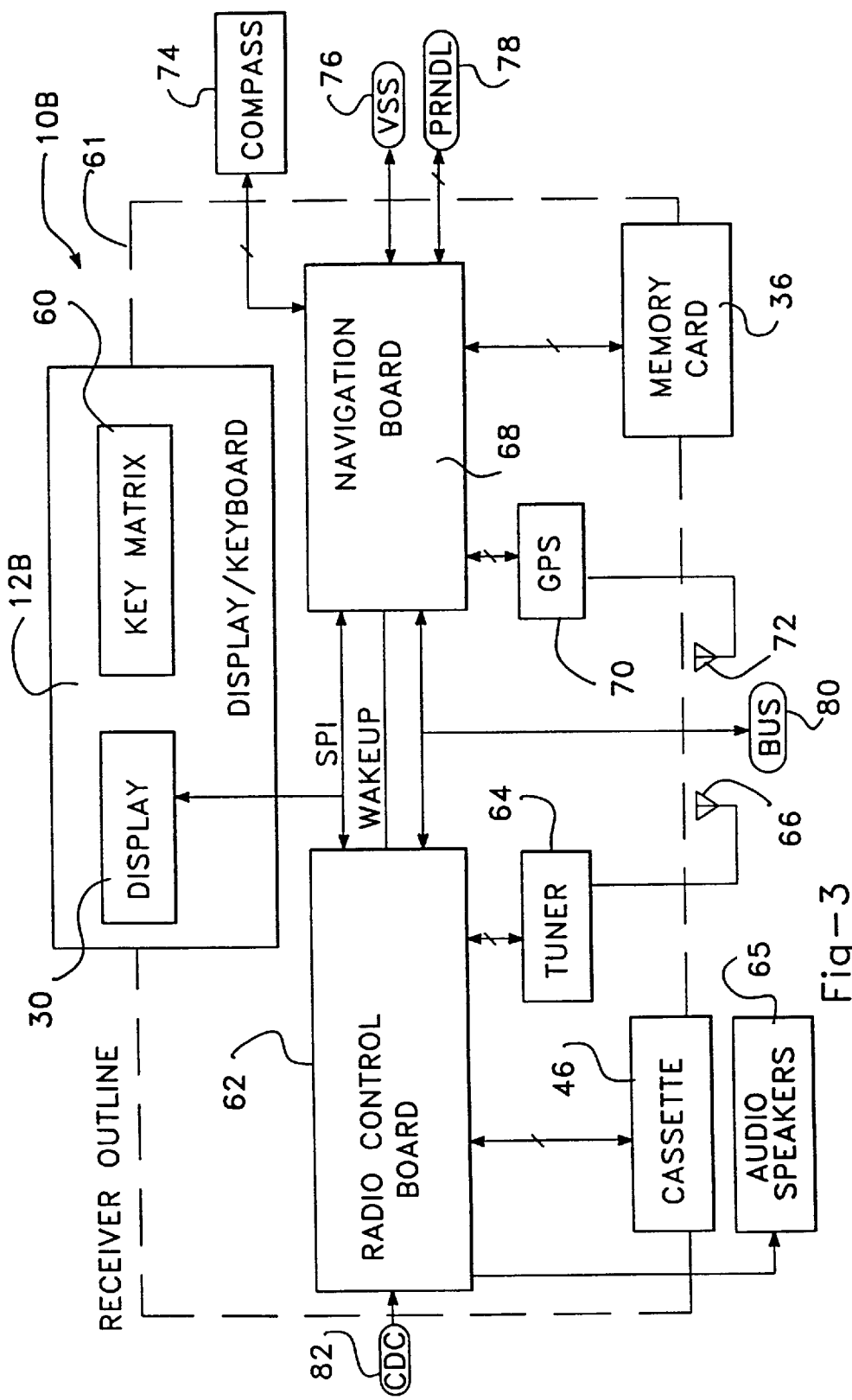
FIG. 3 is a block diagram of the integrated navigation/audio entertainment system shown in FIG. 2.
Figure 4:
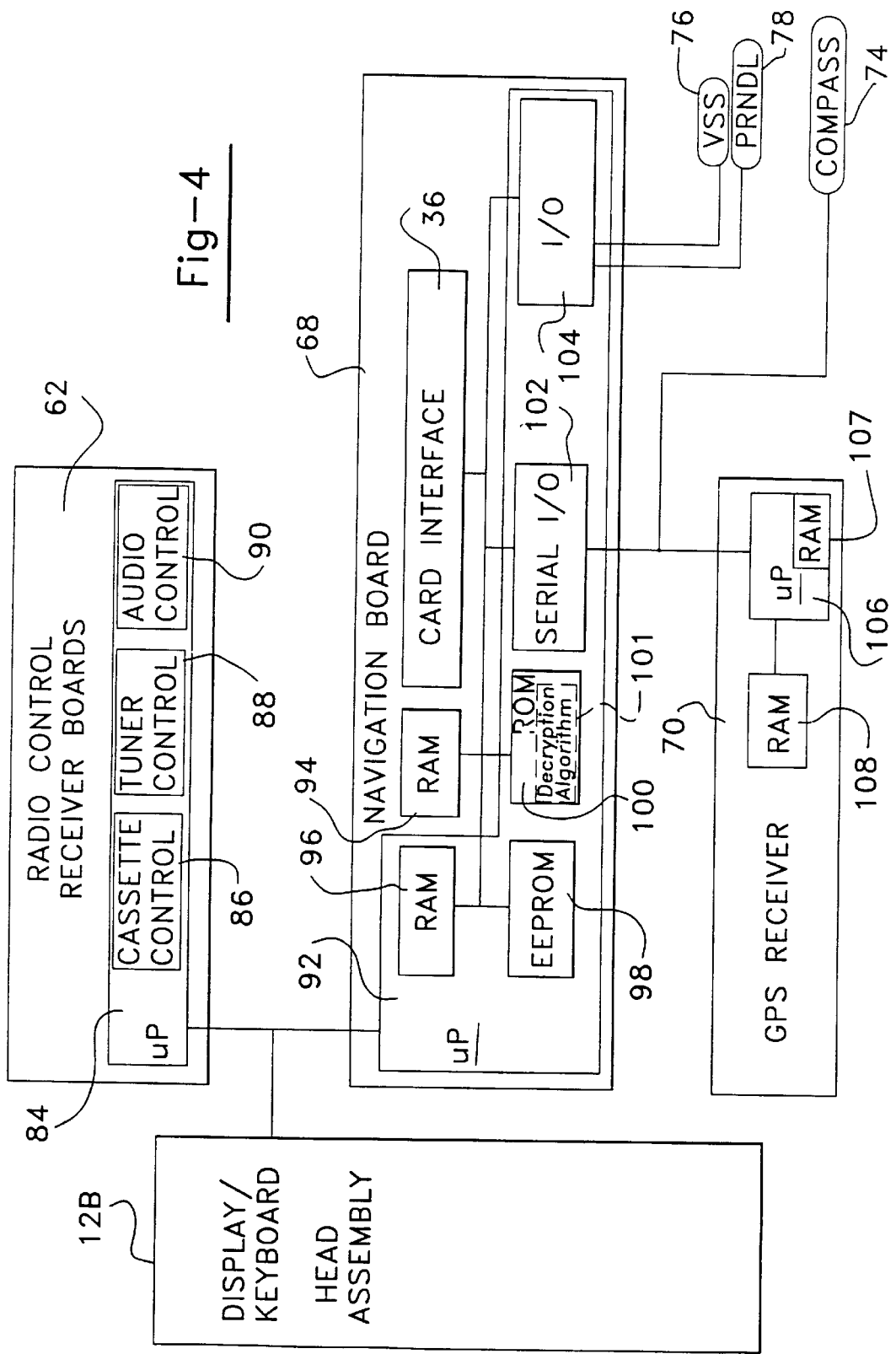
FIG. 4 is a block diagram further illustrating the navigation/audio entertainment system of FIG. 2.

Referring to FIGS. 3 and 4, the navigation/audio entertainment system 10B is further shown to include various interconnected electronics and processing components and signal inputs. As mentioned above, the face plate 12B encompasses shared display 30 and the various user controls as represented by key matrix 60. The housing of system 10B is generally represented by reference numeral 61. Packaged within housing 61 is the audio cassette tape player 46, memory card interface 36 equipped with data access display light 37, a radio control board 62 and a navigation board 68. The radio control board 62 is connected to a radio tuner 64 and the audio cassette tape player 46. The radio tuner 64 is further coupled to an externally located radio antenna 66 for receiving radio wave signals. In addition, audio speakers 65 are generally coupled to the radio control board 62.

The radio control board 62 communicates with the navigation board 68 via an array of communication lines including SPI and WAKEUP lines. The navigation board 68 is connected to the memory card interface 36 and a GPS receiver 70. The GPS receiver 70, in turn, is connected to a GPS antenna 72. According to well known GPS operations, the GPS receiver 70 receives GPS radio wave signals which are emitted from existing GPS satellites and received via the GPS receiving antenna 72. Currently, a constellation of high altitude GPS satellites are in orbit and available to provide continuous worldwide position fixes in all types of weather conditions. The GPS receiver 70 has a built-in processing unit and memory for processing the GPS radio wave signals to determine the latitude and longitude coordinates of the current position, as well as determining the current direction of travel.

More specifically, the GPS receiver 70 continuously receives radio wave signals from the GPS antenna 72 and determines accurate position coordinates which identify the location of the received signals. This determination includes calculating the distance from various satellites to determine a location relative thereto. By measuring the current signals sent by the GPS satellites and knowing orbital parameters of the satellites, the GPS receiver 70 is able to determine the location thereof and generate longitude and latitude position coordinates identifying the position of the received signals.

More particularly, with the received GPS signals, the latitude and longitude position coordinates of the GPS receiver 70 are determined by computing distance from each of several GPS satellites currently visible to the receiver 70 by direct line-of-sight. Distance is determined by precise computation of the time required for radio signals to travel from the GPS satellite to the GPS receiver 70. Combined with precise information about the satellites' positions relative to the earth, precise latitude and longitude coordinates are computed.

At speeds greater than a few miles per mile, the GPS receiver 70 can also determine a precise direction of travel. The receiver 70 determines rate of change in range or relative speed to each visible satellite. Combined with precise knowledge of satellite orbits and the earth's rotation, the ground velocity (i.e., speed and direction) of the GPS receiver 70 can be precisely determined. The determined direction heading is preferably used as a reference while the vehicle is moving at a speed of greater than five miles per hour, for example.

GPS is widely known and should be understood to those skilled in the art as a means for providing accurate position location information with an accuracy within one-hundred (100) meters or better for over ninety-five percent (95%) of the time. It should also be understood that enhanced accuracy may be obtained with GPS now and in the future. For example, a differential receiver could also be employed to provide the availability of differential GPS which offers enhanced position determining accuracy.

The navigation board 68 receives a number of signal inputs which include a signal indicative of the vehicle direction heading as generated by a magnetic flux gate compass 74 according to one embodiment. According to a second embodiment, the direction heading signal may alternately be generated with a gyro compass. The gyro compass offers the advantage of immunity to magnetic noise such as is common in urban environments and near power distribution centers. Accordingly, the gyro compass may be more desirable when GPS blockages combined with high magnetic noise levels can be expected. The direction heading indication provided by compass 74 is used as back-up heading information which serves as a reference for determining straight-line direction to a selected destination when the vehicle's speed drops below five miles per hour. The direction heading signal from compass 74 is also is used with the back-up dead reckoning system when GPS is unavailable.

Additionally, a vehicle speed sensor(VSS) signal 76 is received by the navigation board 68 to provide an indication of vehicle speed. Also received by the navigation board 68 is a transmission position (PRNDL) signal 78 which provides an indication of a forward or reverse direction of travel of the vehicle. Together, the direction heading signal provided by a compass 74, as well as the vehicle speed sensor signal 76 and transmission position signal 78 allow for the backup dead-reckoning system to complement the GPS position coordinates.

With particular reference to FIG. 4, the radio control receiver board 62 is shown to contain a microprocessor 84. The radio control receiver board 62 is also equipped with some type of memory such as EEPROM (not shown). The radio control microprocessor 84 generally handles the audio entertainment controls. For instance, microprocessor 84 functions as an audio cassette tape control 86 for controlling the audio cassette tape player 46. In addition, microprocessor 84 also operates as a tuner control 88 and an audio control 90 for controlling the audio radio and sound operations as should be evident to one skilled in the art.

The navigation board 68 also contains its own navigation control microprocessor 92 for controlling the primary navigation functions of the present invention. The microprocessor 92 has built-in random access memory (RAM), electronically erasable programmable memory (EEPROM) 98, read only memory (ROM) 100, a serial input/output 102 and an input/output 104. The EEPROM 98 and ROM 100 generally contain the necessary programmed instructions for performing the primary calculations to determine distance and direction to selected destinations. Also included on the navigation board 68 is random access memory (RAM) 94 and the memory card interface 36. The random access memory (RAM) 96 or 94 preferably contains programmable memory locations for storing destination information and for continually storing variables used to determine the direction and distance information as processed by the navigation control microprocessor 92.

The navigation board 68 contains a decryption algorithm 101 stored in memory. The decryption algorithm 101 is preferably stored within the read only memory (ROM) 100 and is therefore non-programmable. The decryption algorithm 101 can decrypt encrypted data and authenticate a properly formatted commercial data product. The data product is initially encrypted with an encryption algorithm based on unique properties of the data itself. The decryption algorithm 100 therefore returns the data to a plainly readable format that can be read and processed by the navigation system 10. The built-in decryption algorithm 101 can be a general algorithm that is applied to any authentic data product regardless of data content. It should be appreciated that the decryption allows access to user programmed data cards. It should be appreciated that two different types of authentication could be provided. One algorithm may validate a card for use in any navigation system, thereby allowing data providers to produce cards for general sale and use. Another algorithm may validate a data card for use only in navigation systems only when the data identification code for a given data format matches the user identification code for the corresponding navigation system. This allows a user to create authentic data cards for use when needed without producing a card usable in any other navigation system. The authentication codes are stored as a series of authentication codes within the encrypted data product.

The GPS receiver 70 also includes a built-in GPS control microprocessor 106 and random access memory (RAM) 108. Microprocessor 106 also contains built-in random access memory (RAM) 107. The random access memory (RAM) 107 or 108 preferably stores the radio wave signals received from the GPS receiving antenna 72 for processing. The GPS control microprocessor 106 processes the received radio wave signals and calculates the current latitude and longitude position coordinates thereof in addition to calculating the current direction of travel. The calculated position coordinates and direction data may thereafter be stored in RAM 107 or 108.

Figure 5:
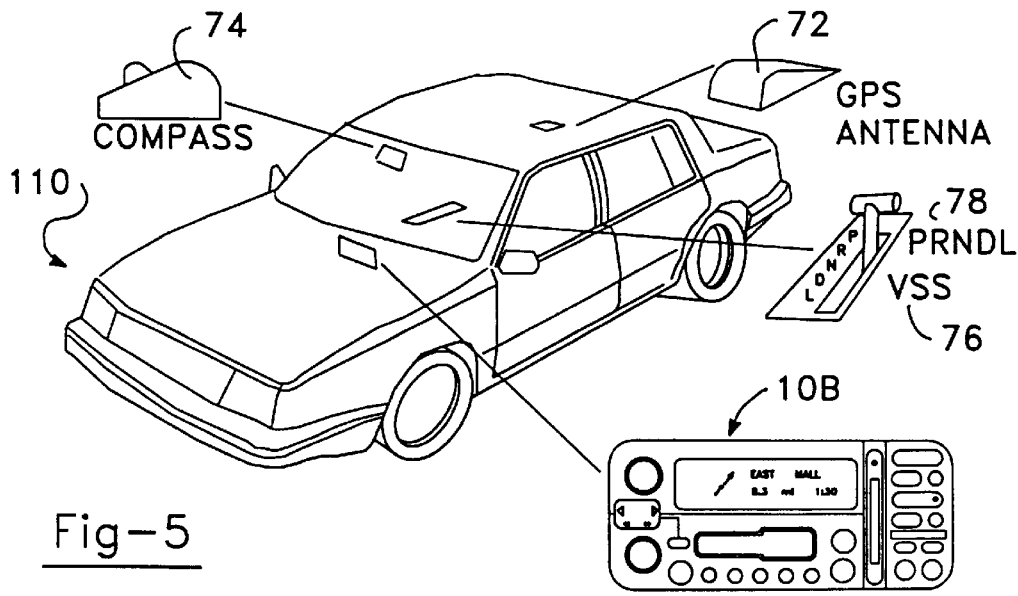
FIG. 5 is a view of an automotive vehicle equipped with the navigation system of the present invention.
Figure 9:
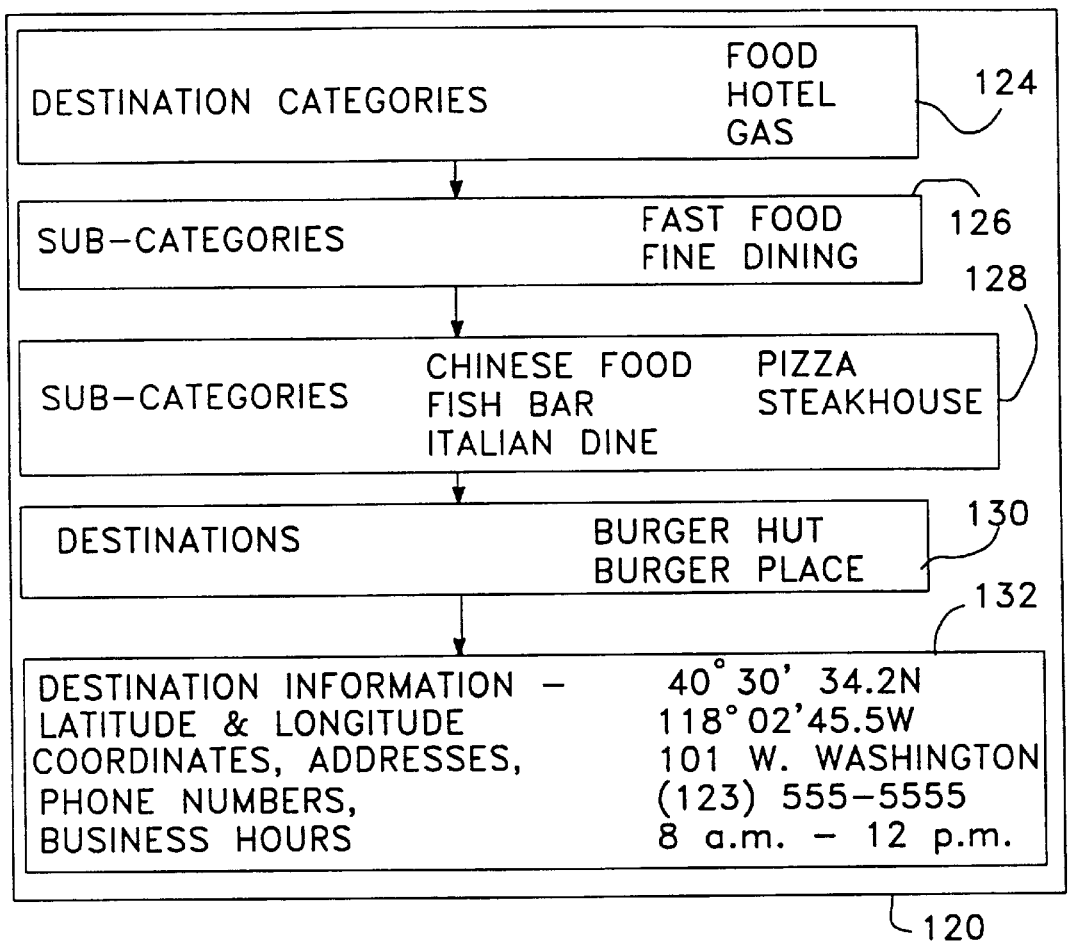
FIG. 9 illustrates categories, categorized destinations and destination information contained in the data base that is stored on the memory card of FIG. 8.

According to a preferred embodiment, the navigation system 10 may easily be mounted in an automotive vehicle 110 as shown in FIG. 5. According to the automotive vehicle application, the navigation system 10 may easily be mounted within the dash of the vehicle 110 in a manner similar to the mounting of a car radio. Accordingly, the key matrix 60 and display 30 are easily accessible by the driver or a passenger in the vehicle 110. The magnetic flux compass 74 is located near the upper midportion of the windshield near or within the rearview mirror assembly. The vehicle speed sensor (VSS) signal 76 and transmission position (PRNDL) signal 78 are taken from the vehicle transmission. The GPS antenna 72 is preferably mounted on the roof of the vehicle 110 and exposed to GPS radio wave signals.

Figure 6:
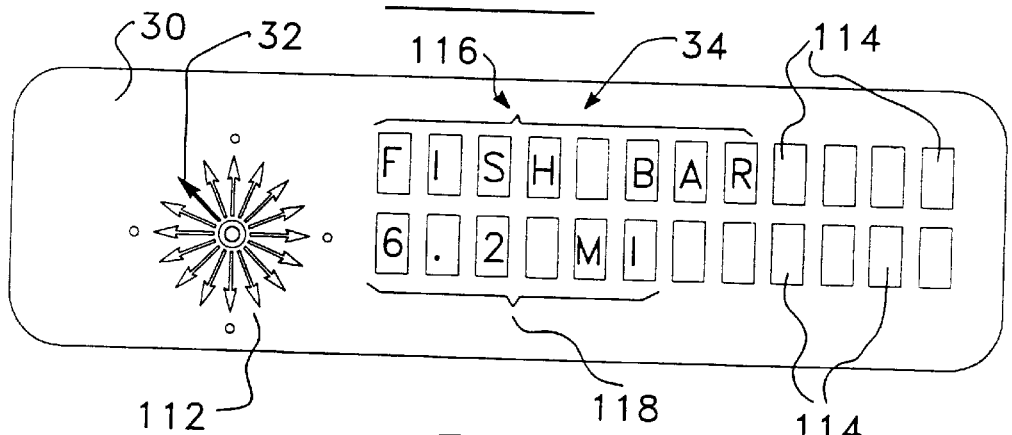
FIG. 6 is a schematic view of the display graphics employed by the navigation system of the present invention.

With particular reference to FIG. 6, the display 30 is shown in an enlarged schematic view. The display 30 is a simplistic and inexpensive alphanumeric text with direction pointing arrow display. According to one embodiment, display 30 is a vacuum fluorescent (VF) display. Alternately, display 30 may include a liquid crystal display (LCD) equipped with back-lighting. Other similar simplistic and inexpensive displays which can produce a variable straight-line direction pointing arrow or the like and alphanumeric text can alternately be employed.

The display 30 shown includes a direction pointing arrow display 112 containing a plurality of equi-angular direction pointing arrows such as arrow 32. According to the embodiment shown, direction pointing display 112 includes sixteen possible arrow selections equi-angularly displaced 22.5° about a 360° rotation. The appropriate direction pointing arrow such as arrow 32 is selected and actively displayed as a darkened arrow to provide an indication of the straight-line direction from the current position of the GPS receiver 70 to a selected destination. The arrow direction may vary and is determined by the calculated direction as referenced to the current vehicle heading provided by the GPS receiver 70 or backup compass 74. The direction pointing arrow 32 pointing upward indicates that the destination is directly ahead of the vehicle, while the direction pointing arrow 32 pointing downward indicates that the destination is directly behind the vehicle. The direction pointing arrow 32 pointing to the right indicates that the destination is to the right and that the driver of the vehicle may turn the vehicle when appropriate. Likewise, the direction pointing arrow 32 pointing to the left indicates that the destination is to the left.

The navigation display 30 further includes alphanumeric character displays 114 for displaying alphanumeric characters. Character displays 114 each preferably include an array of segments, pixels or a dot matrix for economically displaying alphanumeric characters such as individual alphabetical, numeric or other symbolic characters. The display 30 is equipped with a limited number of character displays 114. As shown, a total of twenty-four character displays 114 are divided between a top line and a bottom line of text. The text information 34 may include various menu categories, subcategories, destinations, distance information, and a wide variety of alphabetical, numerical and text information. As shown in FIG. 6, a destination name 116 is provided on the top line. Displayed on the bottom line is a distance as determined from the current position to the selected destination. While the distance shown is displayed in miles, the metric equivalent of the distance in kilometers (km) could likewise alternately be displayed.

Figure 7:
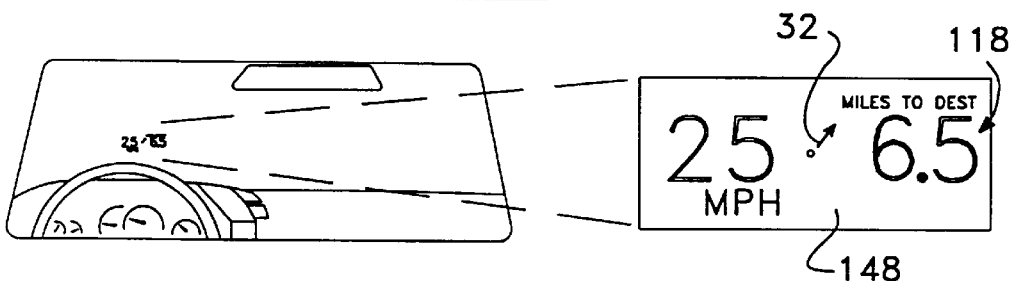
FIG. 7 is a perspective view of a head-up-display which may be employed to supplement the display of FIG. 6 according to an alternate embodiment.

The navigation system 10 of the present invention may further employ a head-up-display 148 as shown in FIG. 7. The head-up-display 148 provides an easy to view image of the vehicle speed looking through the front windshield when driving a vehicle. The head-up-display 148 may further show the straight-line direction pointing arrow 32 and distance information 118 as a complement to the display 30. The added use of the head-up-display 148 allows for easy viewing of the direction and distance so the vehicle driver can easily view the continuously updated navigation information while driving the vehicle.

Figure 8:
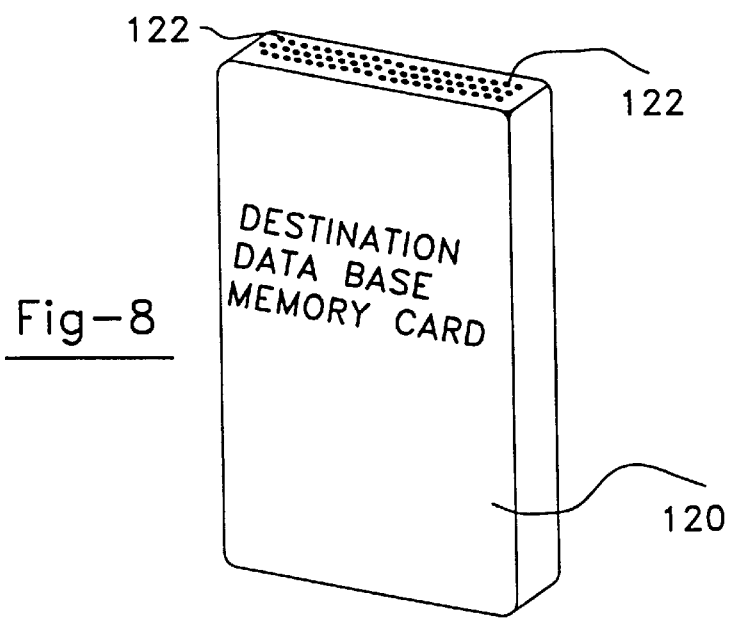
FIG. 8 illustrates a readable PCMCIA standard memory card which contains categorized destinations and destination information in a data base.

Referring to FIG. 8, a preferred memory card 120 that is used to provide a categorized destination data base is shown therein. According to one embodiment, the memory card 120 is formatted to PCMCIA standards and contains selectable destinations in a categorized business directory data base that is stored on read only memory (ROM) within the memory card 120. One example of the PCMCIA memory card 120 is Model No. FE02M-20-10038-01 manufactured and sold by Centennial Technologies, Inc. This particular memory card 120 has a PCMCIA standard interface which includes a total of sixty-four female electrical connector holes 122 provided at the connector end for receiving pin connectors within the memory card interface 36. It should be appreciated that a plurality of memory cards 120 may be selected from to view desired destinations and destination-related information made available for a predefined geographic territory. By inserting the appropriate metropolitan area memory card into the memory card interface 36, thousands of destinations become available for exploration by a user. In doing so, a user may select from the various categories and sub-categories to find a desired destination from the destination data base on the memory card 120.

Figure 8A:
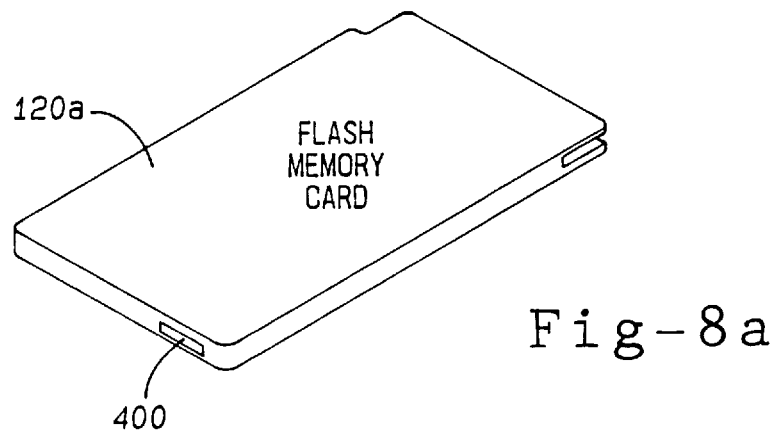
FIG. 8a illustrates a user programmable flash memory card which may contain user modifiable destination information according to one embodiment of the present invention.
Figure 8B:
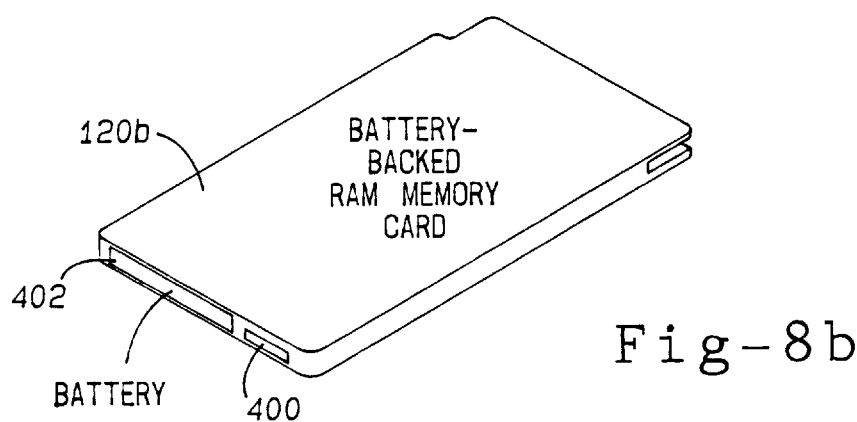
FIG. 8b illustrates a user programmable battery-backed random access memory (RAM) memory card which may be employed according to an alternate embodiment of the present invention.

According to a second embodiment, the memory card 120 is shown as user modifiable memory cards 120a and 120b in respective FIGS. 8a and 8b containing user programmable nonvolatile memory. The programmable non-volatile memory card 120a in FIG. 8a contains a non-volatile flash memory which enables the user to reprogram selected blocks of memory. More specifically, flash memory enables selected blocks of memory to be erased in a quick and easy manner, without requiring individual conductor lines connected to each location of memory that is to be erased. The blocks of memory can be of ultraviolet light (UV) erasable EPROM units but more typically are made of EEPROM units. One example of a PCMCIA memory card 120a containing flash memory is Model No. iMC002FLSA-20, manufactured and sold by Intel Corporation. Flash memory card 120a also contains a write protection switch (WPS) 400.

In lieu of the flash memory, a programmable memory card 120 containing individually electronically erasable programmable memory (EEPROM) units could be used. However, such an EEPROM memory requires individual "erase" conductor lines connecting each of the memory locations to be erased. This requirement expands the block of memory, increasing its cost per block. Hence, flash memory may be preferred.

Referring to FIG. 8b, another type of semiconductor memory that one might consider to be non-volatile and reprogrammable would be a battery-backed random access memory (RAM). A battery-backed RAM memory card 120b is shown in FIG. 8b according to another embodiment of this invention. The battery-backed RAM memory card 120b includes random access memory (RAM), with a battery powered-supply 402 for providing an active charge to the random access memory so that the memory locations continuously store the programmed information thereon. The battery-backed memory card 120b likewise is shown in a PCMCIA standard format and also contains the write protection system (WPS) 400. An example of a PCMCIA battery-backed RAM memory card 120b is Model No. WWB201ES20/40, manufactured and sold by Seiko-Epson Corporation.

U.S. Pat. No. 5,014,098 to Schlais et al. discloses a high density CMOS chip having small amounts of EEPROM, which could be used to form a less expensive memory card that has only limited reprogrammability. However, this may be all that is desired for a card intended to be reprogrammed in the mapless navigation system itself.

Figure 8C:
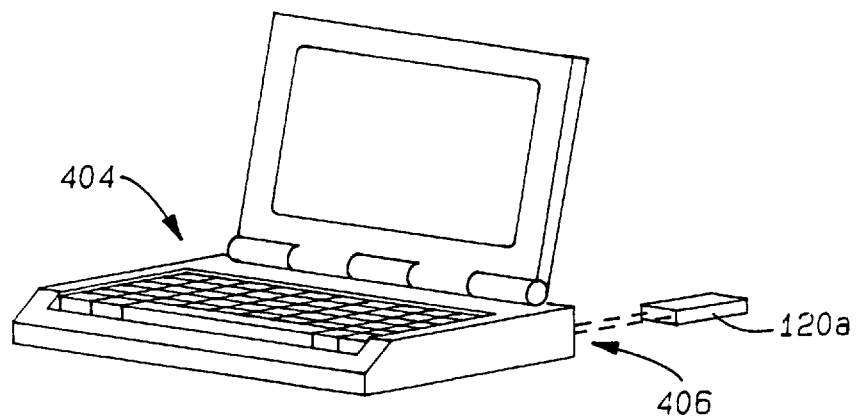
FIG. 8c is a perspective view of a personal computer equipped with one of the user programmable memory cards for remotely reprogramming the destination information according to the present invention.

Accordingly, the programmable non-volatile memory enables a user to advantageously modify or reprogram the destination information contained on a given memory card. The reprogramming of memory card 120a or 120b can be accomplished as shown in FIG. 8c. Preferably, given standard memory card connectors, such as a PCMCIA standard format, the user modifiable memory card 120a or 120b can be connected to a remotely located personal computer (PC) 404 at the convenience of the user. As shown, a portable personal computer 404 is equipped with a standard PCMCIA memory card connector 406 on the back side of the computer 404. Memory card connector 406 contains sixty-four male electrical connector pins for receiving the sixty-four connector holes in the PCMCIA memory card 120a or 120b in a plug-in fashion. Accordingly, with the use of a personal computer 404, a user is able to access the memory card destination information and modify such information thereon.

Alternately, the memory card 120a and 120b could also be reprogrammed with the navigation system. That is, with memory card 120a or 120b loaded into memory card interface 36, the user may store information on the programmable memory card. For example, when in the same destination category 142, a user may save a currently selected destination or current position in the programmable memory card either as an alternate to or in combination with the user programmable data base provided in RAM in the navigation system. Accordingly, this enables a user to reprogram or modify memory card 120a or 120B either through the navigation system or with a personal computer 404 as explained herein.

Figure 8D:
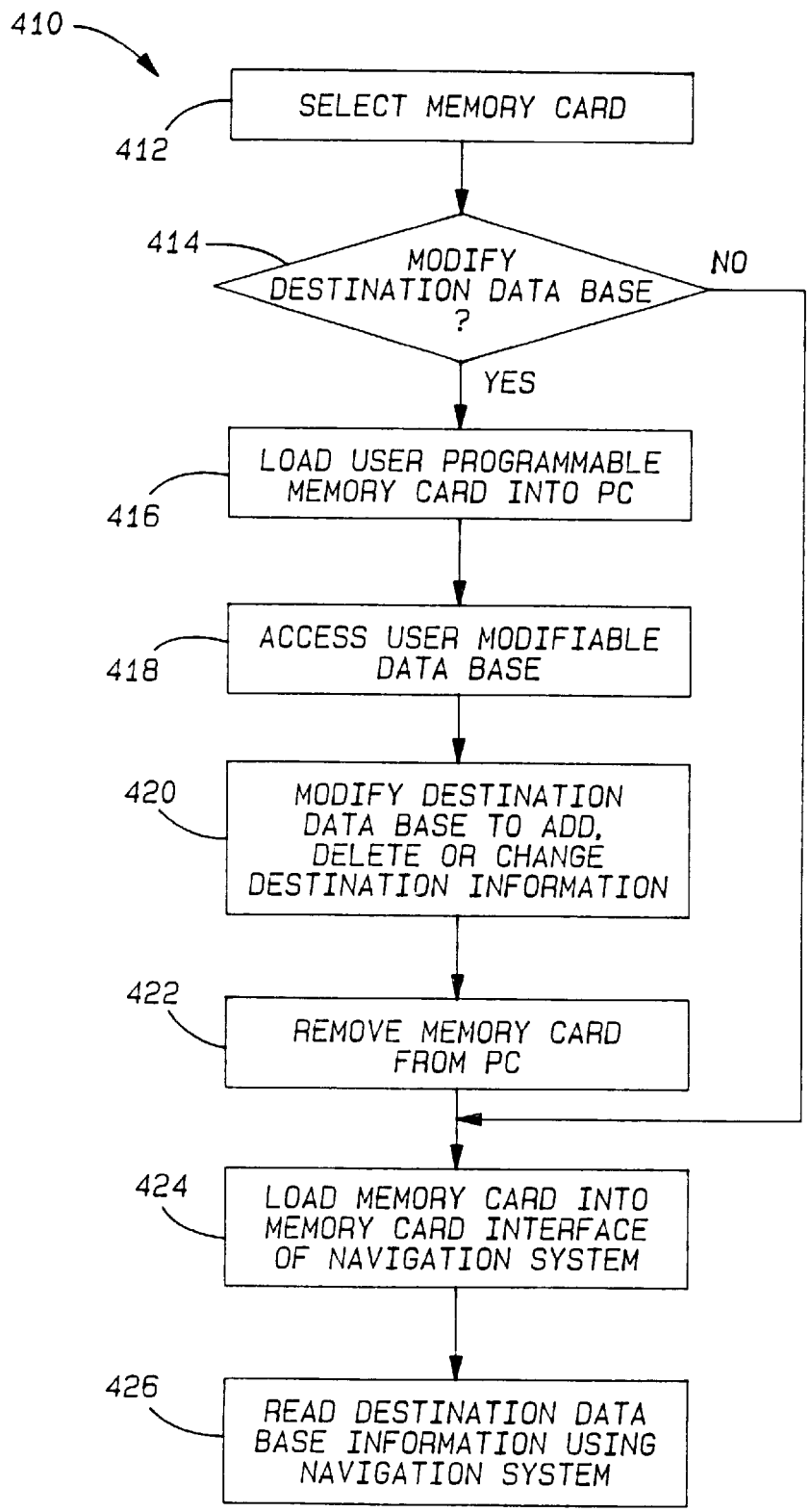
FIG. 8d is a flow diagram illustrating a methodology of reprogramming the user reprogrammable memory card according to the present invention to achieve a user customized data base.

With particular reference to FIG. 8d, a methodology 410 of reprogramming a user modifiable memory card such as memory card 120a with a personal computer 404 is illustrated therein. The methodology 410 generally begins with step 412 by selecting the desired user programmable memory card 120a or 120b. In step 414, the methodology 410 checks to see if the user wants to modify the data base information on the selected memory card. If so, the methodology 410 proceeds to reprogram the memory card beginning with step 416, otherwise it skips to use the memory card in the navigation system according to step 424. Pursuant to step 416, the user loads a user programmable memory card 120a into a personal computer 404 or other reprogranmable device which has matching connector pins and is compatible for interfacing with the given memory card. Proceeding to step 418, the user modifiable data base is accessed via the personal computer 404. This is accomplished with the use of compatible hardware and software as should be evident to one skilled in the art. Referring to step 420, the destination data base is modified so as to add, delete and/or modify destination information contained within the destination data base on the memory card. This may include updating business destination information to take into consideration recent changes such as the opening of a new business and closing of an old business, moving of a business to another location, changes in a phone numbers or business operating hours, etc. The user is preferably advantageously allowed to modify the original destination information and also add additional information onto the memory card data base as is desired to customize the destination data base for the user's use.

Once the memory card 120a has been reprogrammed as desired, the memory card 120a is removed from the personal computer 404 as provided in step 422. The user may then load the programmed memory card 120a into the memory card interface 36 of the navigation system as shown in step 424. As described herein, the destination data base information may be read while the navigation system is used as referred to in step 426.

Accordingly, a user is able to modify the destination data base to provide a customized memory card which may adequately serve the user for a given geographical territory. While examples of a flash memory, EEPROM, and battery-backed RAM non-volatile memory are discussed herein, it should be evident that the present invention is applicable to other forms of user modifiable memory. Also, while a given PCMCIA standard memory card format is described, other standard formats may be employed to the effect that a user is able to access the destination data base and perform the necessary reprogramming to modify the data base information.

As previously mentioned, the destination data base memory card 120 contains a plurality of destinations arranged in a menu hierarchy of categories and sub-categories. According to one embodiment, the destination data base memory card 120 may contain programmed destination information as provided in FIG. 10. As shown, a plurality of destination categories 124 are provided which may include category selections such as food, hotel, gas, and other identifiable destination categories. Within each of the destination categories 124 may be a plurality of sub-categories 126. For example, within the food category may be sub-categories 126 which include fast food, casual dining, fine dining among other food sub-categories. Within the data base hierarchy of sub-categories, there may be another sub-category 128. For example, the sub-category 126 for casual dining may include further sub-categories 128 such as Chinese food, fish bar, Italian dining, pizza and steak house and other possible casual dining sub-categories.

It should be appreciated that various levels of categories and sub-categories may be provided and selectively sequenced through to access the desired destination name, destination position coordinates and related destination information. When selecting the destination category 124, and any sub-category such as sub-categories 126 and 128, a plurality of destinations may be selected from as provided in block 130. For each destination, the corresponding latitude and longitude position coordinates are provided as shown in destination information block 132. The destination data base memory card 120 may further include additional destination information relating to the corresponding destinations as shown in block 132. The additional destination information 132 may include the address of the particular destination, the phone number thereof and normal business hours, for example. It should be appreciated that the destination information 132 may encompass most any kind of numeric, alphabetic and symbolic text information that can be displayed on the display 30.

Figure 9A:
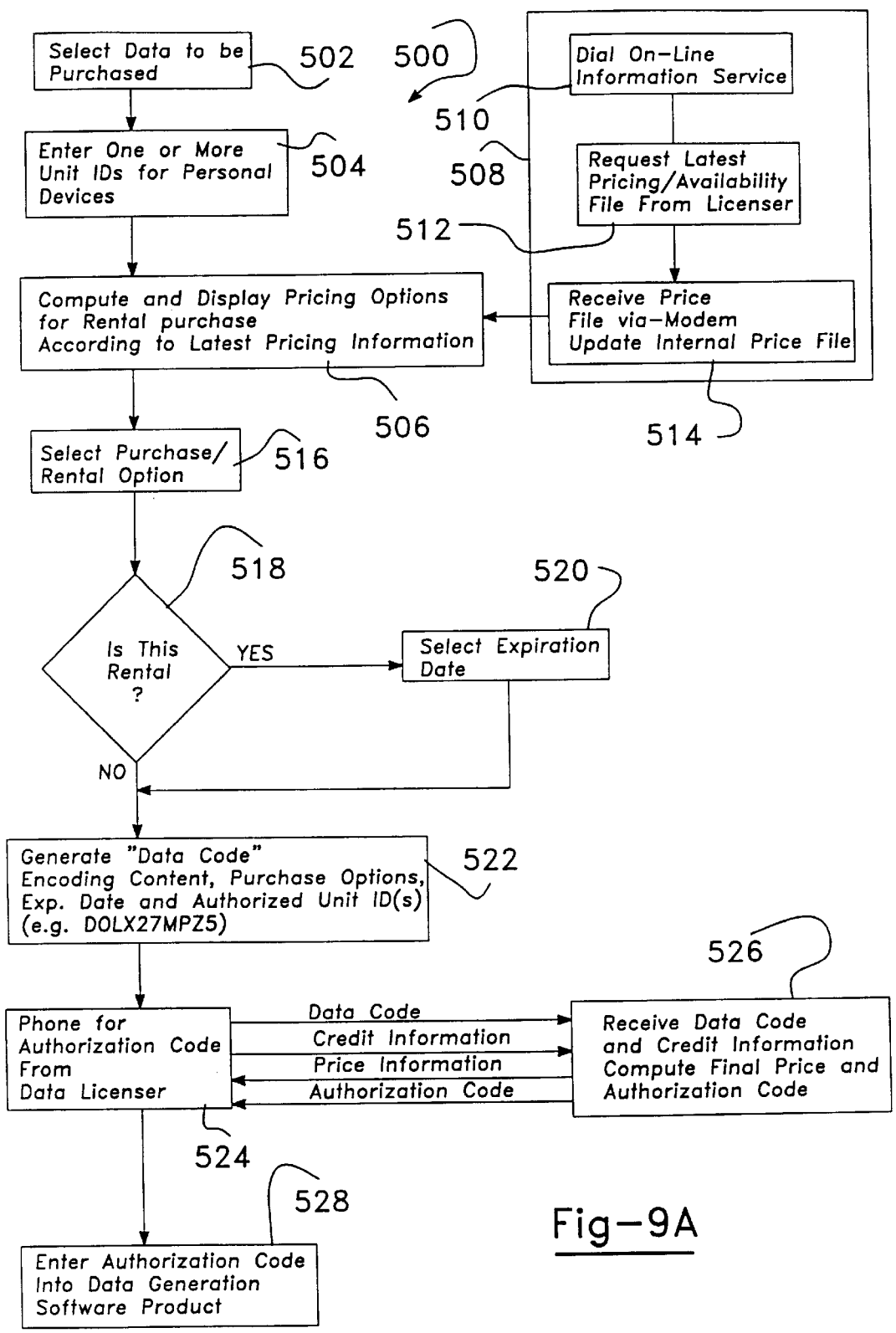
FIG. 9A is a flow diagram illustrating data product acquisition and authorization code set-up for accessing data according to the present invention.
Figure 9B:
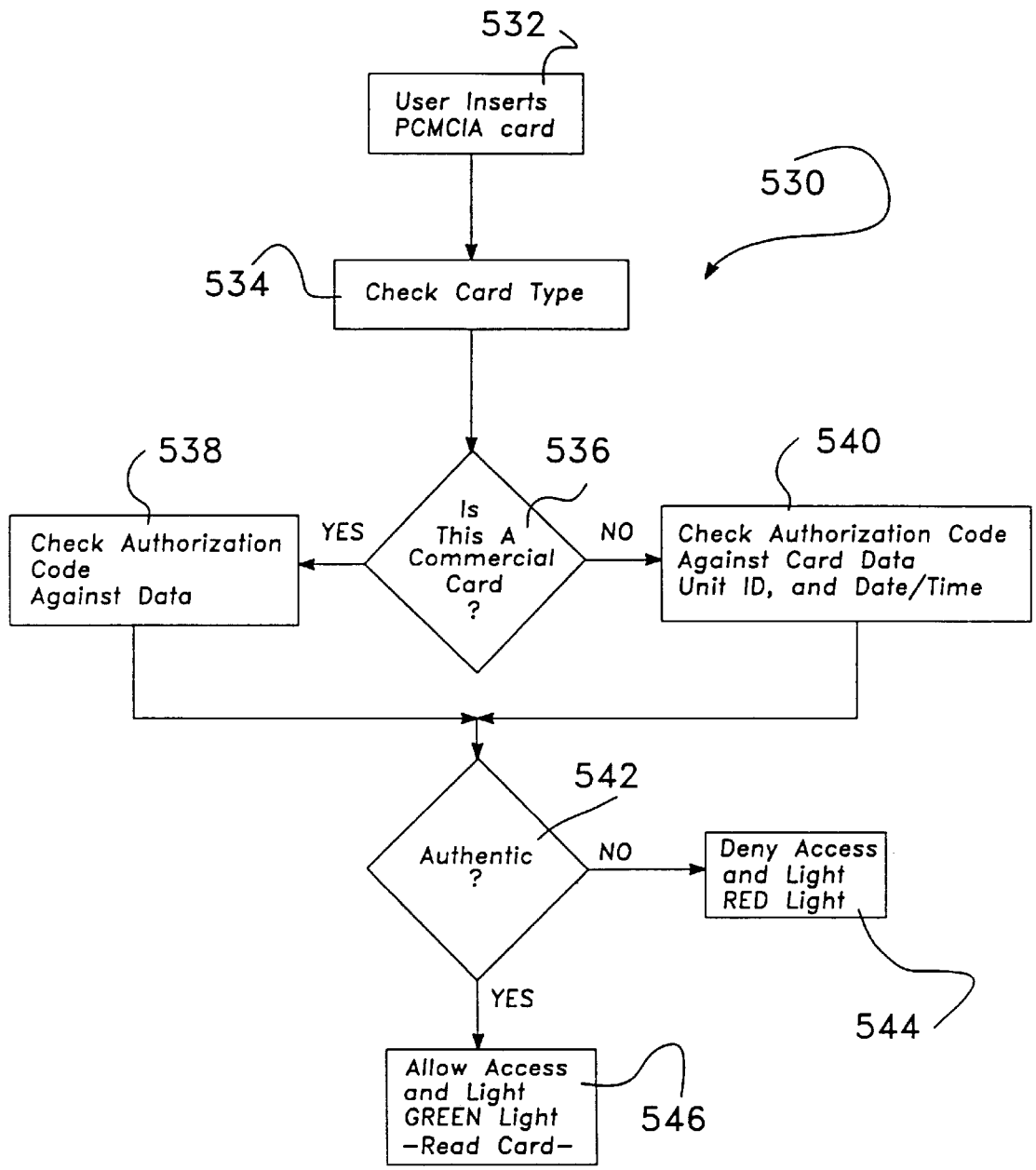
FIG. 9B is a flow diagram illustrating a data product authorization check methodology according to the present invention.

Data access control to allow access to authorized data information while denying unauthorized data access is illustrated in FIGS. 9A and 9B according to the present invention. The navigation system 10 uses data encryption and decryption to authenticate data cards both to reduce unauthorized copying (e.g., piracy) on a widespread basis and ensure that a given data card contains valid data before attempting to access the data information. To achieve data information access, the user data identification coding contained within the encrypted data on a given memory card is required to match the navigation identification coding provided for the given navigation system. In this manner, data information from the given memory card is accessible only to one or a limited number of navigation systems. This prevents the unauthorized copying and subsequent use of data information for use in other systems which do not contain the proper identification codes.

With particular reference to FIG. 9A, a methodology 500 of acquiring data information and providing the appropriate authorization code is shown therein. Beginning at step 502, a user is able to select data to be purchased from an on-line information service 508. Similarly, data may be acquired from stored information on a CD-ROM or other data service provider. Data acquisition from the on-line information service 508 is preferably accomplished through interfacing with a personal computer (PC) for communicating information via a modem to a preferred PCMCIA memory card. Given a particular navigation system, the user or an alternate input means may enter one or more navigation system authorization identification codes for the particular navigation system or device as provided in step 504. Pursuant to step 506, the pricing options for data rental or purchase are computed and displayed according to the latest available pricing information. The pricing options for rental purchases are preferably provided from the on-line information service 508. This is accomplished by accessing the on-line information service 508 as shown in step 510 and requesting the latest pricing/availability file from a licensor as shown in step 512. Pursuant to step 514, the price file is received via a modem update internal price file and transmitted to the requesting user.

Next, the user may select whether to purchase or rent available data information as shown in step 516. Step 518 checks for selection of the rental option, and if the data rental option is selected, a rental expiration date is then selected as shown in step 520. The expiration date defines the time and/or date when access to the acquired data is to be terminated which is generally provided in accordance with the terms of the rental agreement.

Once the pricing and purchase/rental requirements are complete, the methodology 500 will proceed to allow generation of the data code which includes encoding content, purchase options, expiration date and authorized unit identification coding as illustrated in step 522. Given this information, the user may phone for the authorization code which is preferably provided by the data licensor as shown in step 524. Via the telephone or other form of communication, the user may provide the data licensor with a data code and credit information, and in return the user may receive a computed final price and authorization code from the data licensor as shown in step 526. The user thereafter enters the authorization code into the data generation software product according to step 528.

A methodology of accessing authorized data information is shown in detail in FIG. 9B according to a preferred embodiment of the present invention. Step 532 of methodology 530 requires that the user insert a PCMCIA memory card containing the data information into a memory card reader such as memory card interface 36 of navigation system 10. Step 534 will check for the particular type of card, e.g., commercial card, user programmed, or user programmed rental, that is being used. In step 536, if the memory card is a commercial data card the navigation authorization code is checked against the data identification code pursuant to steps 536 and 538. If the memory card employed contains rental information, the authorization code is checked against the card data identification code, unit identification coding and date and/or time of day as provided in steps 536 and 540. Decision block 542 determines if the memory card and data information is authentic and therefore employable by the user in this particular navigation system. If the data information is determined not to be authentic, data access is denied and the access display light 37 illuminates a red light indicative of access to the data information denied as shown in step 544. If the data information is determined to be authentic, methodology 530 precedes to step 546 to allow access and causes access display light 37 to illuminate a green light indicative of authorization to access the data information on the particular memory card through this particular navigation system being employed.

Since navigation systems are often used for travel, the customer may wish to rent data for a given area and only for a limited period of time. The present invention also allows the user to purchase an authorized consumer card that will pass authorization in listed units only until a certain date and/or time passes. Since GPS-based navigation systems of this type have a built in time and date source that is generally inseparable from the basic location information, the navigation system can automatically cut off access to the data stored on the memory card after the rental period expires with no further action required on the part of the data licensee or the licensor.

To accomplish the date and/or time comparison with the expiration date, the navigation system 10 determines the time and date, preferably via the GPS signals. This is accomplished by the GPS receiver 70 computing an accurate time or day and date from the GPS radio wave signals as receiver 70 receives signals from four satellites and solves for travel time which is used to compute distance from the satellites to the receiver. The radio wave information is commonly encoded in a spread spectrum transmission. Accordingly, the time of day and date information is computed as a byproduct of solving for the location, since time is included in the pulses of information. The GPS computed time and date information is continually determined and makes it difficult for a user to enter a false time or date for a comparison with the expiration date. Alternately, a clock could be employed.

Additionally, the comparison of the navigation system identification code with the data identification code can be examined after a delayed time period has elapsed. This will make it more time consuming for a person to test data on the memory card, thereby making it more difficult to randomly test for a large number of identification codes and therefore more difficult to produce an unauthorized data card for commercial use.

It should be appreciated that a customer/user may purchase a navigation system which contains one of ten thousand identification codes, for example. The user may also create a data card with personal data information which is authorized for units containing the particular identification coding only. The card created in this manner would pass authorization on units containing this relatively rare identification code, thereby rendering the card data useless for most pirate applications. Furthermore, the memory card could actually be written to pass authentication on navigation systems with any one of several identification codes, thereby allowing the card to be used in all of the customer's personal vehicles, for example. This would still render the data product useless for purposes of large scale piracy.

Yet, commercial memory cards could be made available to users without the need for a data identification code. Instead, the data information may be encrypted in accordance with a preferred encryption algorithm without the identification code present. This would allow a manufacturer of memory cards to distribute a large volume of memory cards as desired.

Figure 10:
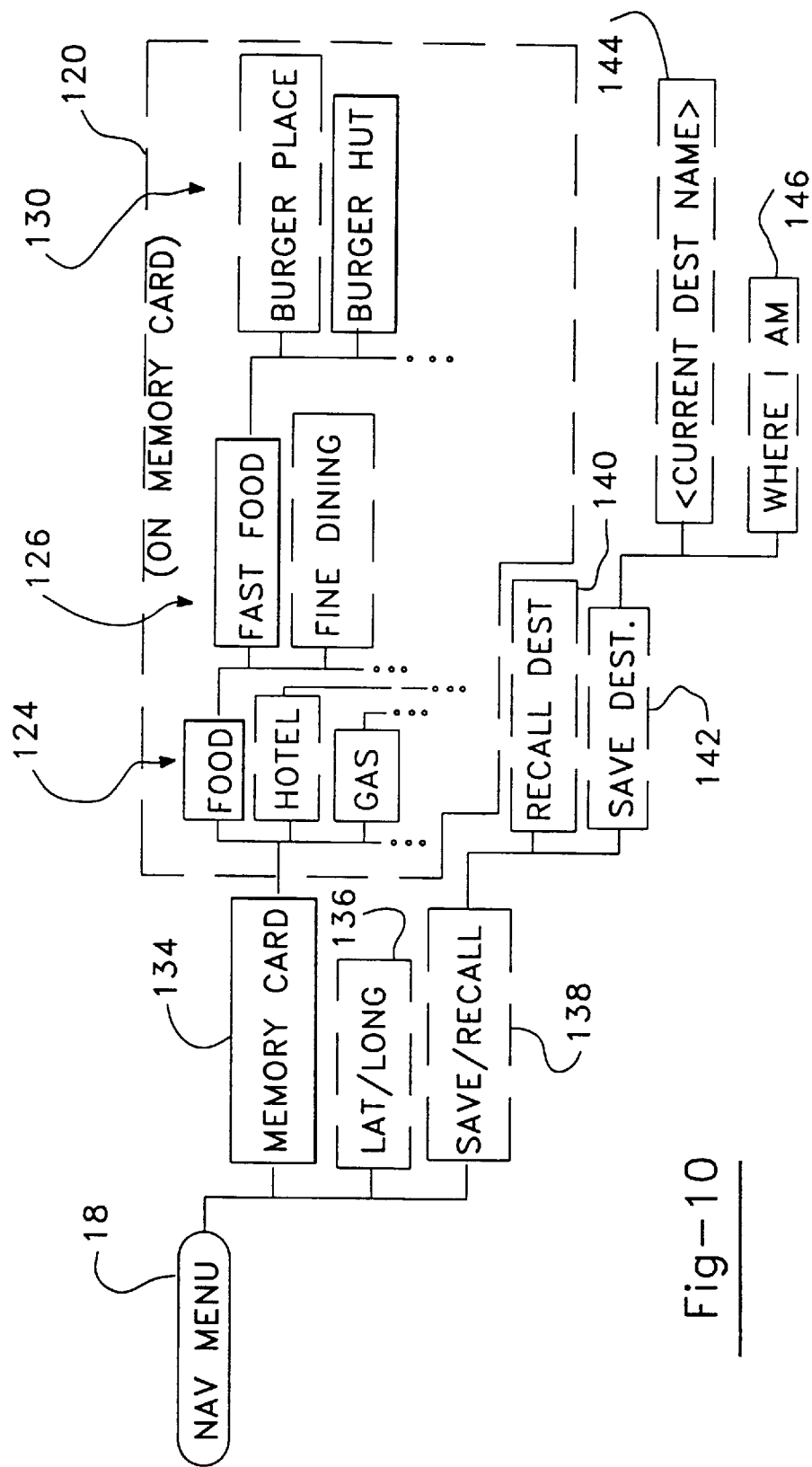
FIG. 10 illustrates menu selections which are available with the navigation system according to one example.

Turning now to FIG. 10, the navigation menu selections and various selections within each menu selection are illustrated therein. With the use of the manually depressible navigation menu pushbutton 18, a user may select the navigation main menu. The navigation main menu includes the memory card menu selection 134, the latitude/longitude position coordinates menu selection 136 and the save/recall menu selection 138. When entering the main menu, the first menu selection, namely the memory card menu selection 134, will be displayed. A user may depress the menu choices rotary pushbutton 16 to select the menu selection shown or rotate the rotary pushbutton 16 to sequence to another menu selection. Once in the selected navigation menu selection, a user may rotate the menu choices rotary pushbutton switch 16 to scroll through the available categories, sub-categories and destinations within the menu selection.

In the memory card menu selection 134, a user may rotate the menu choices rotary pushbutton 16 to scroll through the destination categories 124 and view category selections such as food, hotel and gas. To select a category selection such as food, the user manually depresses the rotary pushbutton 16 when viewing the food category. With the food category selected, the display 30 will show the first selection with sub-category 126. With the use of the menu choices rotary pushbutton 16, a user may sequence through each of the selections in sub-category 126 which may include fast food, fine dining, casual dining, etc. Similarly, the user may select a displayed fast food sub-category by manually depressing the menu choices rotary pushbutton switch 16.

Thereafter, individual destination names 130 may be displayed on the display 30. Again, the user may sequence through a plurality of destination names 130 such as Burger Place or Burger Hut and select the currently displayed destination name by depressing the rotary menu choices pushbutton switch 16.

When in the latitude/longitude position coordinate menu selection 136, a user may program in a set of latitude and longitude position coordinates to identify a selected destination. For each of the latitude and longitude coordinates this includes entering in degrees/minutes/seconds in a form such as 40'30'29.2N, as an example. To enter coordinate information, the user easily rotates the menu choices rotary pushbutton switch 16 to sequence through alphanumeric characters which are sequentially displayed on display 30. When a desired alphanumeric character is displayed, the user may depress the rotary pushbutton switch 16 to select the displayed character. Continued rotary sequencing and depression of the rotary pushbutton switch 16 is repeated so as to sequentially select the next characters until the latitude and longitude position coordinates are entered in.

In the save/recall menu selection 138, a user may select between the recall destination category 140 or the save destination category 142. The recall and save destination categories 140 and 142 allow access to a user programmable data base that may be stored in EEPROM 98 or RAM 94 or 96. This user programmable data base supplements the memory card data base and allows a user to modify and add to the overall available destinations. The navigation system 10B may advantageously share programmable memory with the audio entertainment system. For example, the user programmable memory dedicated to storing radio frequency selections can also be used to store user programmed destinations.

To select either of recall or save categories 140 or 142, a user may toggle between the two categories 140 and 142 by rotating the menu choices rotary pushbutton switch 16 and depressing switch 16 to select the displayed category. When in the recall destination category 140, a user may sequence through a plurality of user stored destinations by rotating the rotary pushbutton switch 16 and depressing switch 16 to select the stored destination that is currently shown.

In the save destination category 142, a user may select between a current destination name category 144 and a current "where I am" position category 146 by rotating menu choices rotary pushbutton switch 16 to the desired category and depressing menu choices switch 16 to make the selection. With the current destination name category 146, the currently selected destination from the memory card 120 may be saved in the user programmable data base. In the current "where I am" position category 146, the current position of the user is saved in the programmable memory. This allows a user to save locations once visited and later recall the saved locations to obtain navigational assistance.

Figure 11:
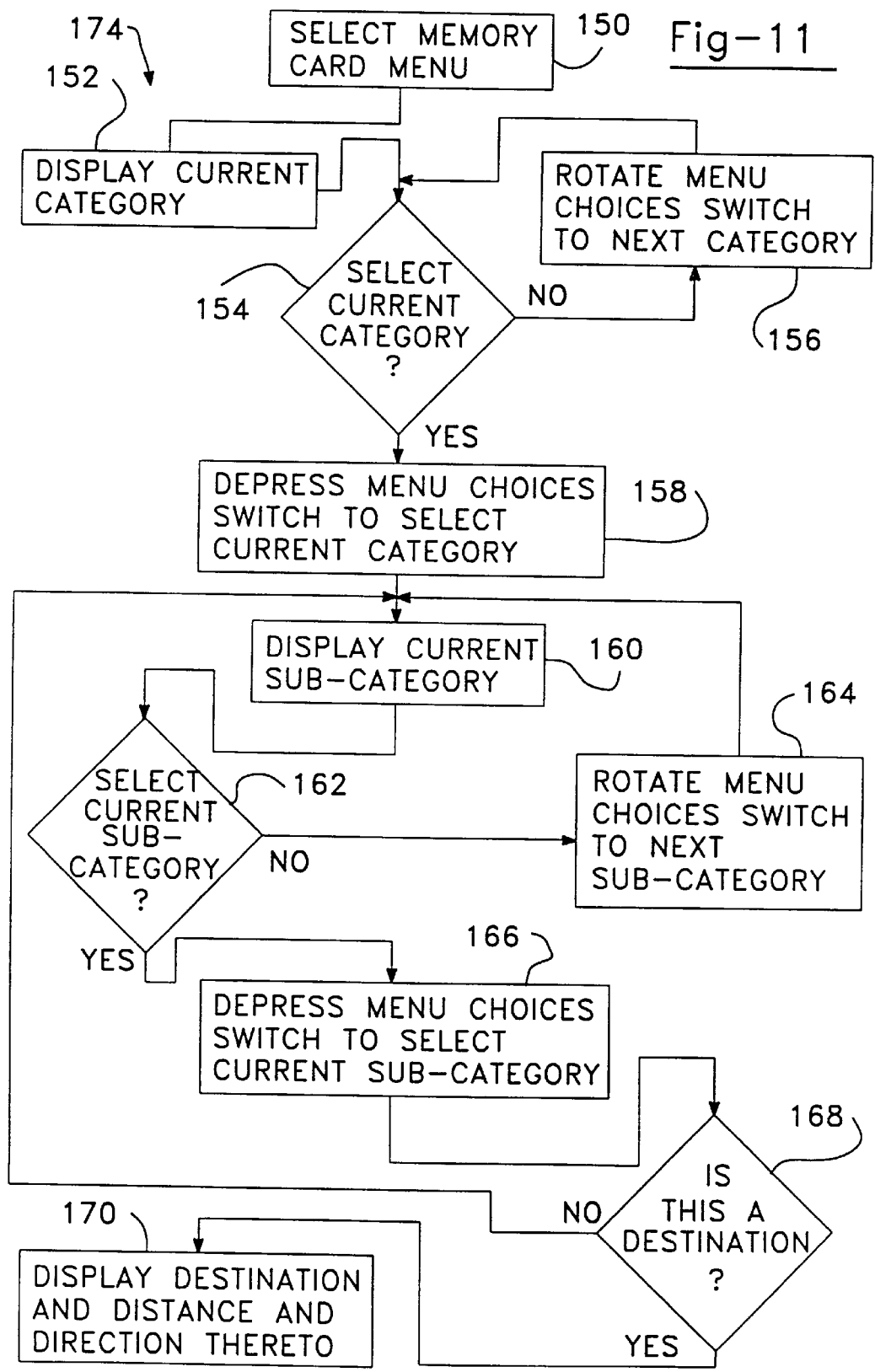
FIG. 11 is a flow diagram illustrating menu selection control with a menu choices rotary/pushbutton control switch.

Referring to FIG. 11, the methodology 174 of selecting among the various categories 124, sub-categories 126 and destinations 130 with the menu choices rotary pushbutton switch 16 is illustrated therein. The methodology 174 begins with the step 150 of selecting the memory card menu. With the memory card menu selected, a current category will be displayed 152. A user may either rotate the menu choices rotary pushbutton switch 16 to scroll through the available categories or may depress rotary pushbutton switch 16 to select the current category shown. According to step 154, if the current category shown is not selected, a user may rotate the menu choices rotary pushbutton switch 16 to the next category or categories as shown in step 156. If the user would like to select the current category, the user can depress the menu choices rotary pushbutton switch 16 to select the current category shown as provided in step 158.

The methodology 174 proceeds to the next step 160 in which a current sub-category is displayed. According to step 152, the user may select the current sub-category or view other sub-categories. To view other sub-categories, the user may rotate the menu choices rotary pushbutton switch 16 to the next sub-category or sub-categories pursuant to step 164. To select the current sub-category shown, the menu choices rotary pushbutton switch 16 may be depressed to select the subcategory shown as provided in step 166.

A user may sequence through as many categories and subcategories as are necessary to select a desired destination from the destination data base. The number of sub-categories that are required to sequence through may vary. Accordingly, in step 168, the methodology 174 checks to see if the current selection is a destination. If the current selection is not a destination, the methodology 174 will return to step 160 to display the current sub-category. On the other hand, if the current selection is a destination, step 170 will display the destination name as well as the calculated distance and direction thereto.

The menu choices rotary pushbutton control switch 16 may include the type having a grounded wiper rotatably moveable between a circular array of equi-angular space contacts in response to rotation of a control knob. A mechanical detent (not shown) on the switch 16 causes the wiper to prefer a position at each contact. Thus, the wiper "clicks" into contact at a predetermined degree of change of rotation of the position of the wiper. The term "click" is used herein to refer to the switch position changes between adjacent contacts. Clockwise rotation of rotary pushbutton control switch 16 advances to the next available selection, while a counter clockwise rotation returns to the previous available selection. According to a preferred embodiment, each rotational click switches to the next available selection. Alternately, a variable changing rate may be employed to more easily accommodate a large number of selections. That is, a user may scroll through the menu selections at a variable rate as a function of rate of change of rotation of the rotary pushbutton control switch 18. A rotary switch control which provides for such a variable rate is disclosed in U.S. patent application Ser. No. 08/179,300, filed Jan. 10, 1994, entitled "Variable Digital Control for Electronic Device with Rotary Switch Control", now U.S. Pat. No. 5,513,268 issued Apr. 30, 1996. The present invention is assignable to the assignee of the aforementioned application.

In addition to the menu choices rotary pushbutton control switch 16, a user may also select from the various other pushbutton navigation controls while operating and viewing the various menu selections and destination information. For example, a menu selection may be undone by depressing the undo pushbutton 22. This, in effect, undoes the last menu and returns the menu selection to the previous selection. Repeated depresses of undo pushbutton 22 sequentially back tracks through the previous selections until the main menu is reached.

The sort by distance pushbutton 24, when depressed, will sort the destinations within a selected category or subcategory as a function of a calculated distance. With the sort by distance pushbutton 24 momentarily depressed, the navigation system 10 will sort all destinations within the selected category or sub-category by radial distance from the current position of the user. This is accomplished by comparing the latitude and longitude position coordinates of each destination within the selected category or sub-category with the current latitude and longitude position coordinates of the user. The sorted destinations are preferably arranged in order of increasing distance so that a user may first view the closest destination and thereafter rotate the menu choices rotary pushbutton 16 to view the next closest destination, if desired. It should be appreciated that the sort by distance operation, according to one embodiment, provides a radial sort by distance which considers all destinations within a 360° rotation, irrespective of their location relative to the vehicle's current direction of travel.

With the sort by distance pushbutton 24 continually depressed for a predetermined amount of time, such as two seconds, a radial sort by distance from a selected destination may be performed. That is, instead of sorting destinations within selected categories or sub-categories from the current position of the user, a radial sort will be performed from a remote selected destination. For example, a user may perform a radial sort by distance from a selected hotel destination to determine the relative distances of available parking lots from the selected hotel. The radial sort by distance from a remote destination will provide an indication of the distance from the selected destination to each of the sorted destinations within the selected category and sub-categories.

According to another embodiment, the sort by distance operation may be limited to sorting destinations by radial distance within a defined angular window centered about the vehicle's direction of travel. For example, all destinations within an angular field of view of forty-five degrees in front of the vehicle may be sorted radially and presented in increasing order to the user. This eliminates destinations which are located remote from the wayward course of travel. To implement a sort by distance with a limited field of view, a user may set the preferred sort mode via an additional options menu within the main menu.

Once a destination has been selected, a user may access additional information pertaining to the selected destination. This is accomplished by depressing the information pushbutton 20. The information pushbutton 20 may be repeatedly depressed to scroll through successive displays of alphanumeric text information made available to the user. For example, the information pushbutton 20 may be depressed once to view the address information pertaining to the selected destination. The next successive depression of pushbutton 20 may display the phone number for the destination, while a third depression of pushbutton 20 may provide the normal business operating hours for the selected destination.

As previously mentioned, the integrated navigation/audio entertainment system 10B may operate in an audio radio mode, a cassette tape mode and the navigation mode. Also, other modes of operation, such as a compact disc (CD) mode, may also be included. It should be understood that one of the audio cassette tapes or radio modes may be operating at the same time as the navigation system functions. In order to provide the proper display between the audio entertainment modes and the navigation modes, the navigation/audio entertainment system 10B is equipped with a radio display pushbutton 56 and a navigation display pushbutton 58. The radio display pushbutton 56 allows a user to view radio information on display 30 for a predetermined amount of time while operating in the navigation mode. According to one example, a time out period of five seconds may expire before returning to the navigation display mode. Alternately, the time out period may be infinite so as to eliminate the automatic return to the previous display mode. Similarly, the navigation display pushbutton 58 allows a user to display navigation information on display 30 when the system 10B is otherwise set in the audio entertainment mode. A time out period may likewise be used to automatically return to the audio entertainment display mode.

Figure 12:
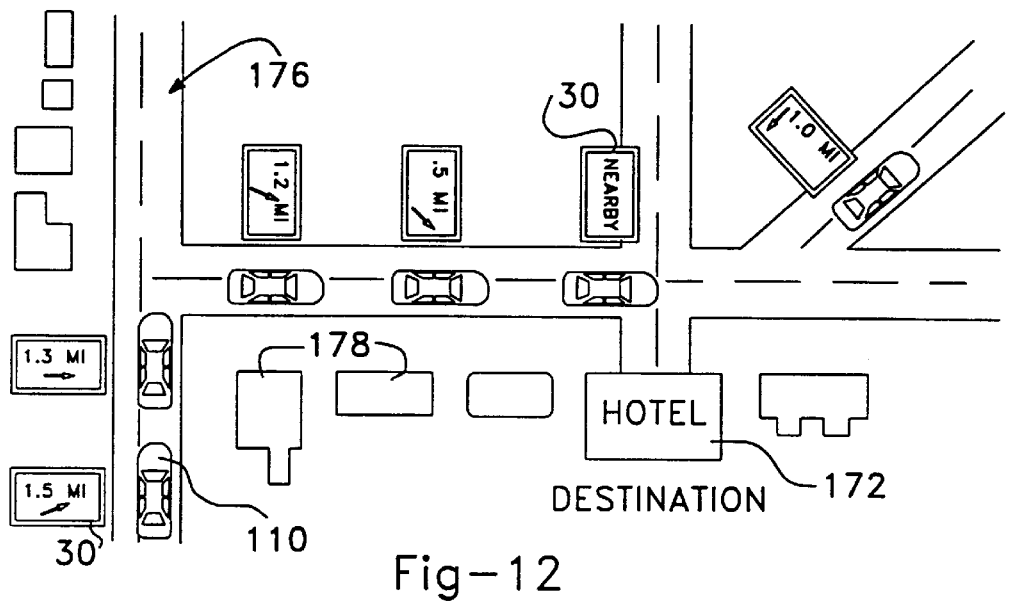
FIG. 12 illustrates the use of the navigation system for assisting a driver of a vehicle to reach a selected destination according to one example.

The use of navigation system 10 for providing navigational services to reach a selected destination is illustrated in FIG. 12. As shown, a vehicle 110 equipped with the navigation system 10 of the present invention is shown at various locations while traveling on streets within a roadway system 176. Initially, vehicle 110 is shown providing distance and direction information with display 30 at a location 1.5 miles from a selected destination which is illustrated namely as hotel 172. As the vehicle 110 proceeds to travel along the roadway system 176, the straight-line distance and direction pointing arrow are continuously updated. The driver of the vehicle may use the straight-line direction indication and distance information to assist in making decisions on how to reach the destination 172. It should be understood that the navigation system 10 does not require the driver of the vehicle 110 to steer the vehicle 110 in the direction of the direction pointing arrow. Instead, the driver of vehicle 110 must consider roadway restrictions and traveling requirements to determine the appropriate route of travel to destination 172.

As the vehicle 110 approaches destination 172 to within a distance of 0.1 miles, the display 30 will display "nearby" and the navigation system 10 will sound an audible alarm signal. According to one embodiment, the audible alarm signal may be produced by audible tones. With the navigation/audio entertainment system 10B, the audible alarm may be produced with audible tones or output from audio speakers 65. If the vehicle 110 proceeds beyond the destination 172, the display 30 will return to displaying the current straight-line direction pointing arrow and distance from the current vehicle position to the destination 172.

Figure 13:
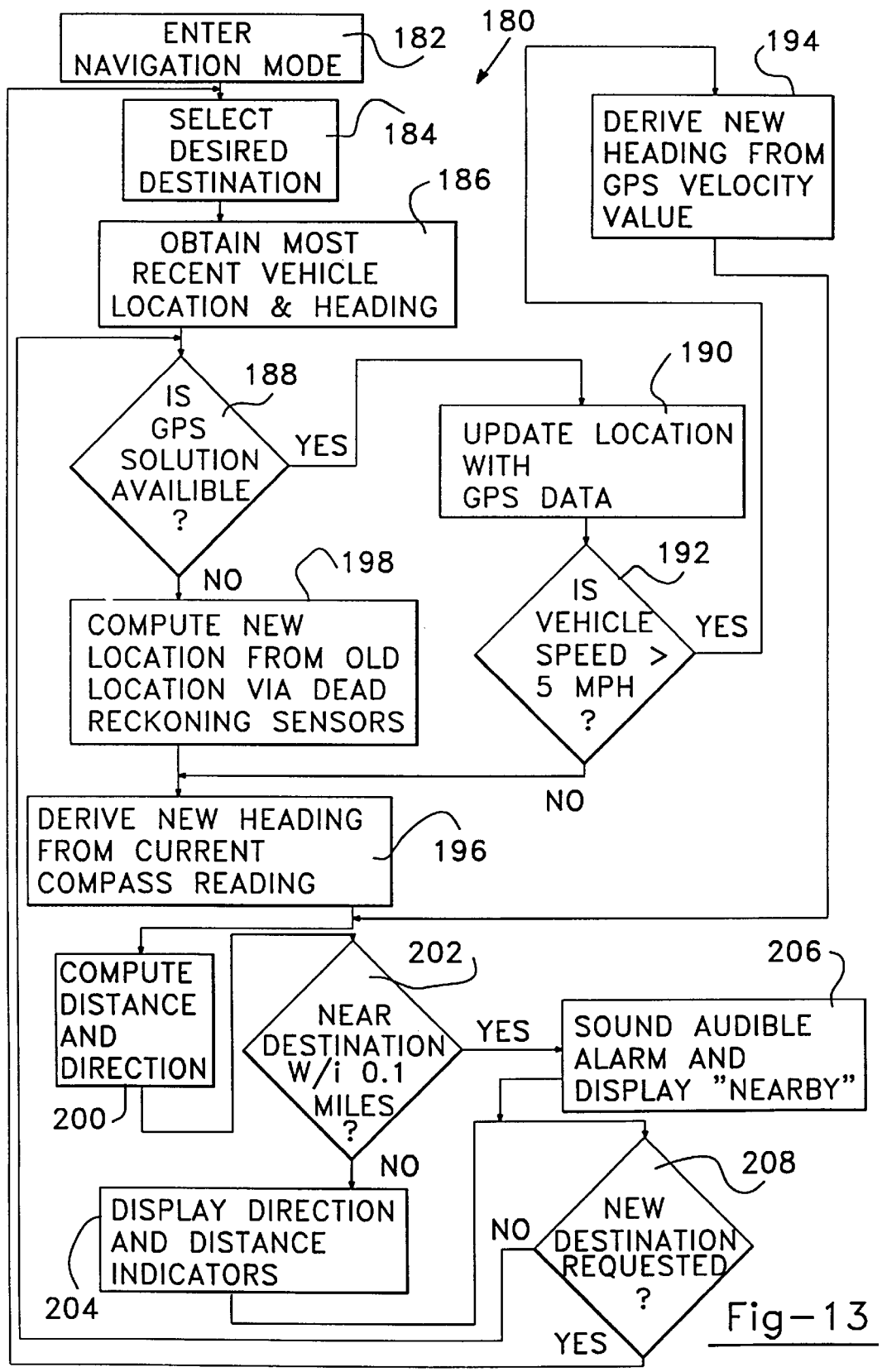
FIG. 13 is a flow diagram illustrating a methodology of providing position updates with the navigation system of the present invention.

Referring now to FIG. 13, the methodology 180 of continuously determining the straight-line distance and direction to a selected destination is illustrated therein. The methodology 180 begins with the entering of the navigation mode as provided in step 182. The user may select the desired destination according to step 184. The navigation system 10 will then determine the most recent vehicle location and direction heading information as shown in step 186.

To obtain the most recent vehicle location and direction heading information, the methodology 180 will check to see if the GPS solution is currently available pursuant to step 188. If the GPS solution is available, the current location is updated with the GPS data as provided in step 190. At the same time, the methodology 180 will continuously monitor vehicle speed to see if the vehicle speed is greater than a predefined speed of say five miles per hour, for example, as shown in step 192. Referring to step 194, if vehicle speed is greater than five miles per hour a new heading is derived from a GPS velocity value and the distance and direction information is computed according to step 200. If, however, the determined vehicle speed is not greater than five miles per hour, a new heading is derived from the current compass reading as provided in step 196 and the computed distance and direction information are calculated according to step 200.

Should the GPS solution not be available as detected in test step 188, the new location is computed from the old location information with the addition of a dead reckoning system as shown in step 198. Currently, existing global positioning systems have been known to suffer from signal blockage caused by tall buildings and other interferences. When the GPS signal is unavailable, the present invention takes into account for any such interferences and enables the navigation system 10 to continue to operate despite the occurrence of GPS interference or other causes of unavailability of GPS. For example, in a typical urban environment, a vehicle may travel a roadway system between various tall buildings in which the GPS radio wave signals may be blocked by an obstruction caused by nearby buildings. This interference condition is known as the occurrence of GPS fade. In order to handle the GPS fade scenario, the navigation system 10 advantageously stores the last set of position coordinates and calculated speed and direction information, in addition to the time the last position coordinates were recorded. With the dead reckoning sensor information, given the vehicle speed sensor signal 76, the transmission position signal 78, compass reading 74 and time related information, the navigation board microprocessor 92 is able to determine an approximate expected location of the mobile user, despite the unavailability of GPS signals. Given the dead reckoning system information and calculations, the methodology 180 is able to derive the new direction heading from the current compass reading pursuant to step 196 and thereafter compute the straight-line distance and direction according to step 200.

With the distance and direction computed, the methodology 180 will check to see if the user is near the destination to within a predefined distance of 0.1 mile, for example. If the vehicle is within 0.1 miles of the destination, an audible alarm is sounded and the display displays "NEARBY" as shown in step 206. Otherwise, the display will provide an indication of the straight-line direction to the destination and the distance therebetween as shown in step 204. In any event, the methodology 180 will check for a new destination requested as shown in step 208 and then return to block 184.

Figure 14A:
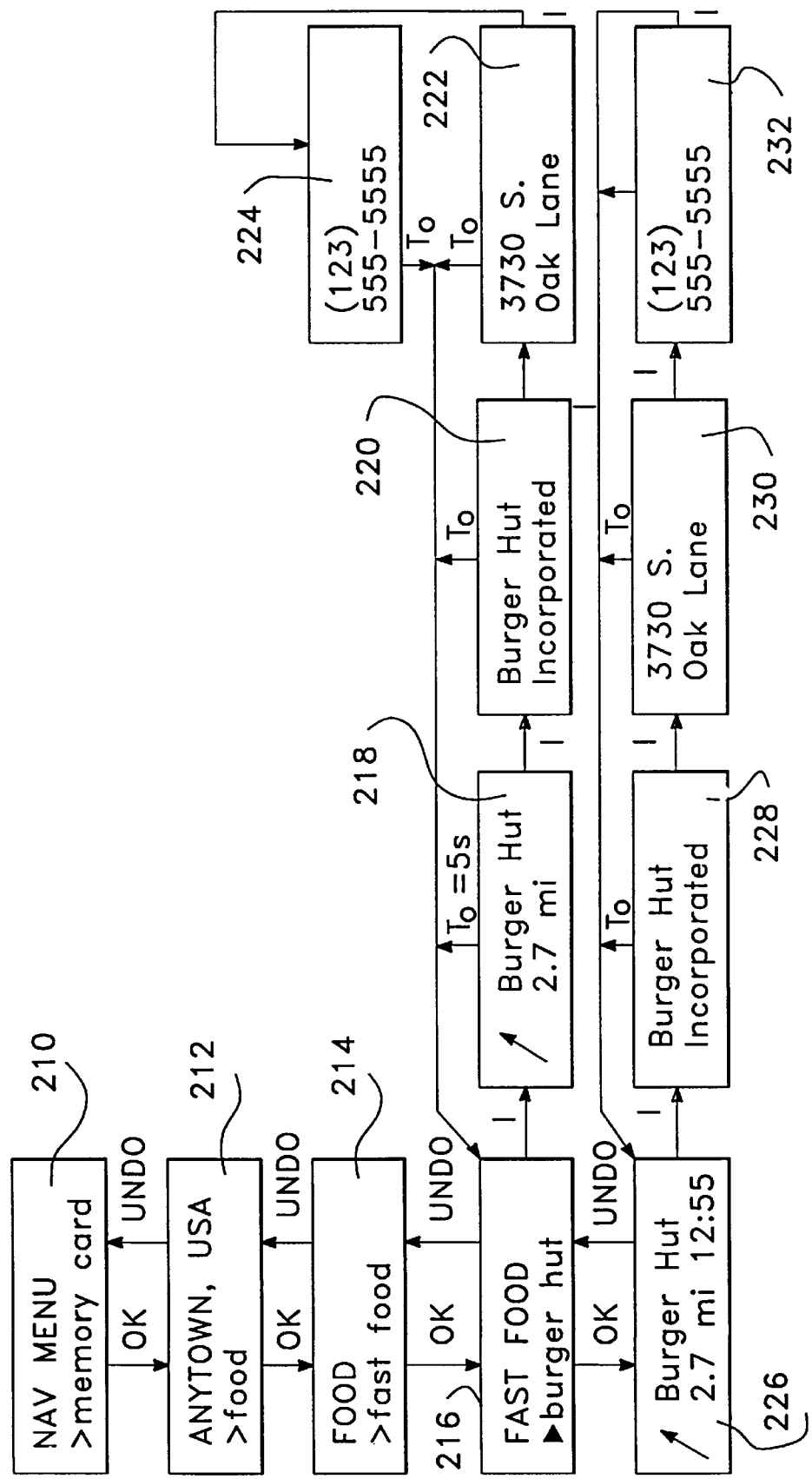
Figure 14B:
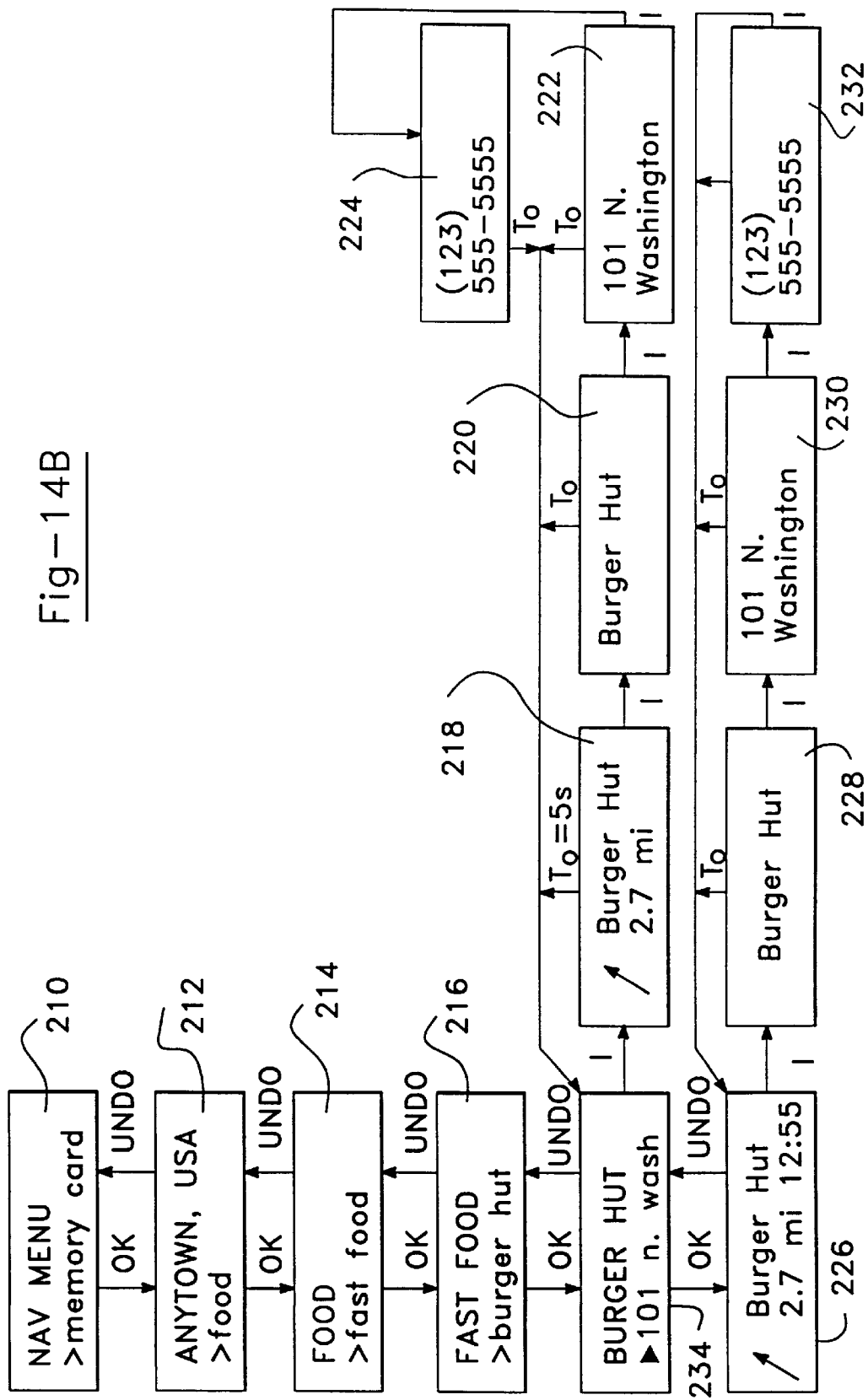

Referring now to FIGS. 14A through 14C, the sequencing of menu selections and displays are illustrated for selecting a destination and destination information from the destination data base stored in memory card 120. With particular reference to FIG. 14A, display block 210 illustrates the initial display 30 showing the navigation menu in capital letters on the top line of text and the selectable memory card menu in small case letters on the bottom line of text. Selection of the memory card menu advances to display block 212 where the geographic territory of coverage provided with the given memory card is illustrated by the description "ANYTOWN USA". Also shown on the bottom line of text is the first category, shown here as the "food" category selection.

A destination category selection which a user may change or select is generally shown preceded by the addition of a carrot sign (>). Selection of the "food" category advances to display block 214 in which the first selection of a sub-category is shown as the "fast food" sub-category. Selection of the "fast food" sub-category with the menu choices rotary pushbutton 16 advances to display block 216. Within the "fast food" sub-category, a user may select one of several available destinations names such as "Burger Hut". An individual destination name is shown preceded by a filled carrot sign (▸).

Once a destination has been selected, additional information may be displayed and explored. For example, given display block 216, the information pushbutton 20 may be depressed to display the updated straight-line distance and direction from the current position to the selected destination, namely Burger Hut, as shown in display block 218. Repeated depression of information pushbutton 20 will advance to display block 220 which displays the full descriptive name of the selected destination. Depression of information pushbutton 20 again will advance to display block 222 to display the address of the selected destination. Another depression of information pushbutton 20 will display the phone number for the selected destination as shown in display block 224.

Referring again to display block 216, depression of menu choices rotary pushbutton 16 will advance to display block 226 to display the direction pointing arrow as well as the destination name and distance from the current position to the selected destination. In addition, the time of day may be displayed as shown. Repeated depressions of information pushbutton 20 will scroll through and display the text information that is available. For example, a first depression of information pushbutton 20 will display the destination name as provided in display block 228. Another depression of information pushbutton 20 will display the address of the destination as shown by display block 230, while a third depression of pushbutton 20 will display the phone number of the selected destination as shown in display block 232.

Each time the information pushbutton 20 is depressed, information is retrieved and shown for a given block of information. Repeated depressions of information pushbutton 20 retrieve successive frames of information that are made available to the user. Each time the information pushbutton 20 is depressed, a timer is set to expire after a time period To equal to five seconds, for example. When the timer expires, the display will return to the last display shown prior to the initial operation of information pushbutton 20.

Referring next to FIG. 14B, similar sequencing and displays are shown when selecting one destination from a plurality memory card destinations which have the same name. As shown in FIG. 14B, the display blocks are substantially the same as those in FIG. 14A, except for the addition of display block 234 which identifies one of a plurality of fast food restaurants having identical names, herein shown as Burger Hut. In addition, display block 234 provides the address for the destination shown. It should be understood that a user may rotate menu choices rotary pushbutton switch 16 to sequence through the plurality of same name destinations and depress switch 16 to select the currently shown destination.

In FIG. 14C, key sequences and displays are shown when selecting destinations sorted by radial distance from the current position of the user. The display blocks 210 through 224 and block 234 are substantially identical to those provided in FIG. 14B. However, at display block 234, a user depresses the "sort by distance" pushbutton 24 to advance to display block 236. The sort by distance operation will compare all destinations within the selected category and subcategories by radial distance from the current position of the navigation system 10. The compared destinations are also sorted and arranged in order of increasing distance from the current position. For example, the sort by distance operation shown will sort all destinations within the subcategory entitled Burger Hut. This allows a user to easily view the closest destination first, and then sequence to the next closest destination, if desired.

With the desired destination selected, a user may depress the information pushbutton 20 to advance to display block 238 which provides the descriptive name of the destination. Additional depressions of information pushbutton 20 will advance to display block 240 to provide the address and then to display block 242 to give the phone number of the destination. Returning to display block 236, depression of the menu choices rotary pushbutton switch 16 will advance to display block 244 to further illustrate the direction pointing arrow, destination name and calculated straight-line distance to the selected destination. Similarly, depression of information pushbutton 20 advances to display block 246 to provide the destination name, and further to display blocks 248 and 250 to provide the address and phone number, respectively.

Figure 15:
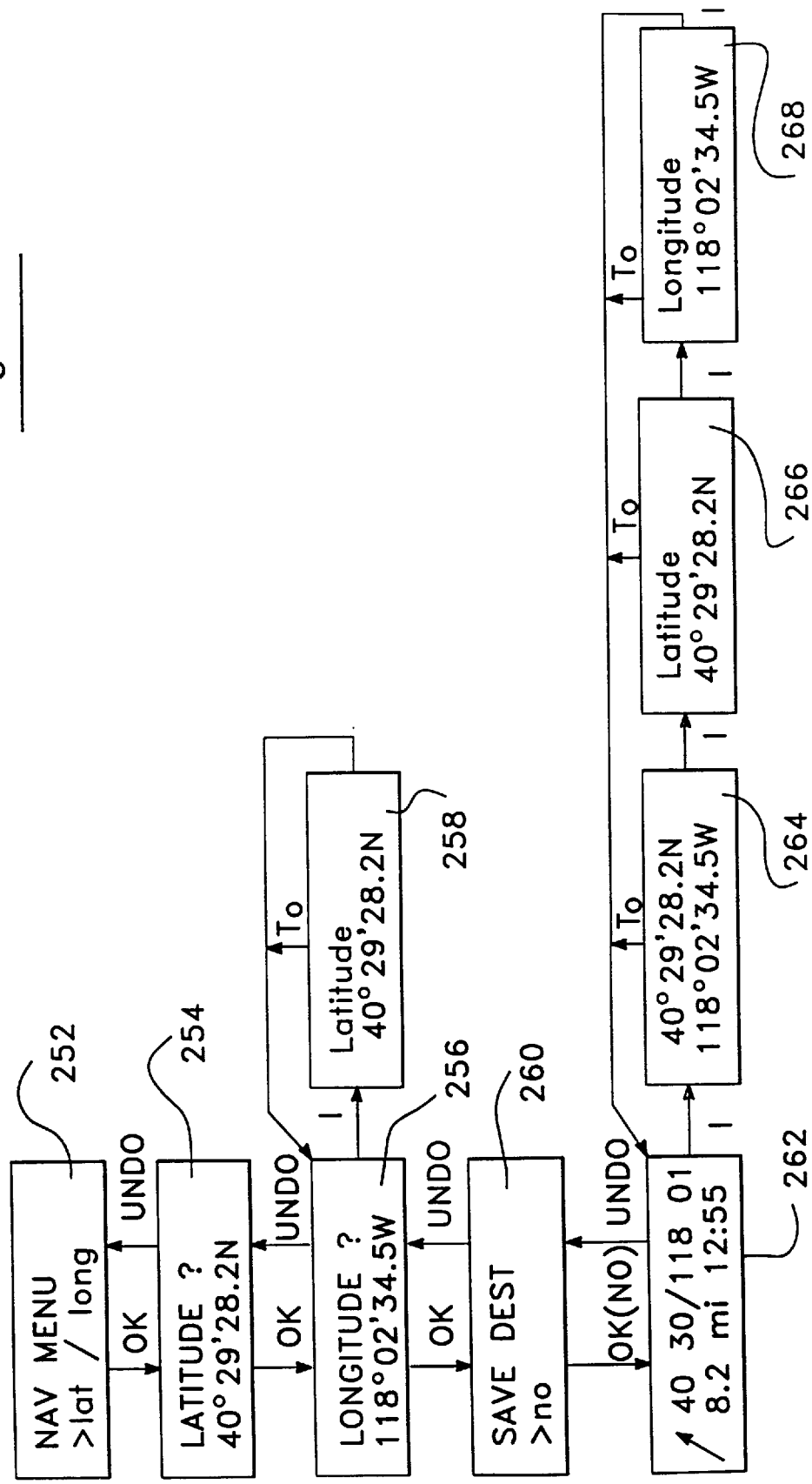
FIG. 15 illustrates a sequencing of menu selections and displays when entering a destination by latitude and longitude position coordinates in the latitude/longitude menu mode.

Turning now to FIG. 15, key sequences and displays are illustrated when entering a destination by the latitude and longitude position coordinates. In doing so, the navigation menu selection is performed with menu choices rotary pushbutton 16 to display the latitude/longitude menu selection as shown in display block 252. Depression of the menu choices rotary pushbutton 16 will select the latitude/longitude menu and advance to display block 254. In display block 254, the user is asked to enter a set of latitude position coordinates. The latitude position coordinates include degrees/minutes/seconds. To enter in the latitude coordinates, the menu choices rotary pushbutton 16 is rotated until a desired character is displayed. With the desired character displayed, a user may depress the rotary pushbutton 16 so as to select that character. The display will then move to the next character position so that the user may then enter in the next character and so on until the latitude position coordinates are entered as shown in display block 254.

Once the latitude coordinates are entered, the user may depress the rotary pushbutton 16 again to advance to display block 256. In display block 256, the user is asked to enter a set of longitude position coordinates by entering degrees/minutes/seconds. A user will rotate the menu choices rotary pushbutton 16 to select and choose the longitude position coordinates as shown in display block 256. Once the longitude and latitude position coordinates are entered, the information pushbutton 20 may be depressed to toggle between the user entered latitude and longitude position coordinates as shown in display blocks 256 and 258. If the latitude and longitude coordinates are correct, the user may depress rotary pushbutton 16 to advance to display block 260.

As shown in display block 260, the longitude and latitude position coordinates as entered may be saved in the user programmable memory location. As shown, however, the entered position coordinates shown are not saved and the display advances to display block 262 in which the latitude and longitude position coordinates are displayed as well as the direction pointing arrow and the straight-line distance and time of day. Depression of information pushbutton 20 will advance to block 264 which shows the latitude coordinates on the top line and the longitude coordinates on the bottom line. Additional depressions of information pushbutton 20 will advance to display blocks 266 and 268 which show latitude and longitude positions coordinates titled by name.

Figure 16A:
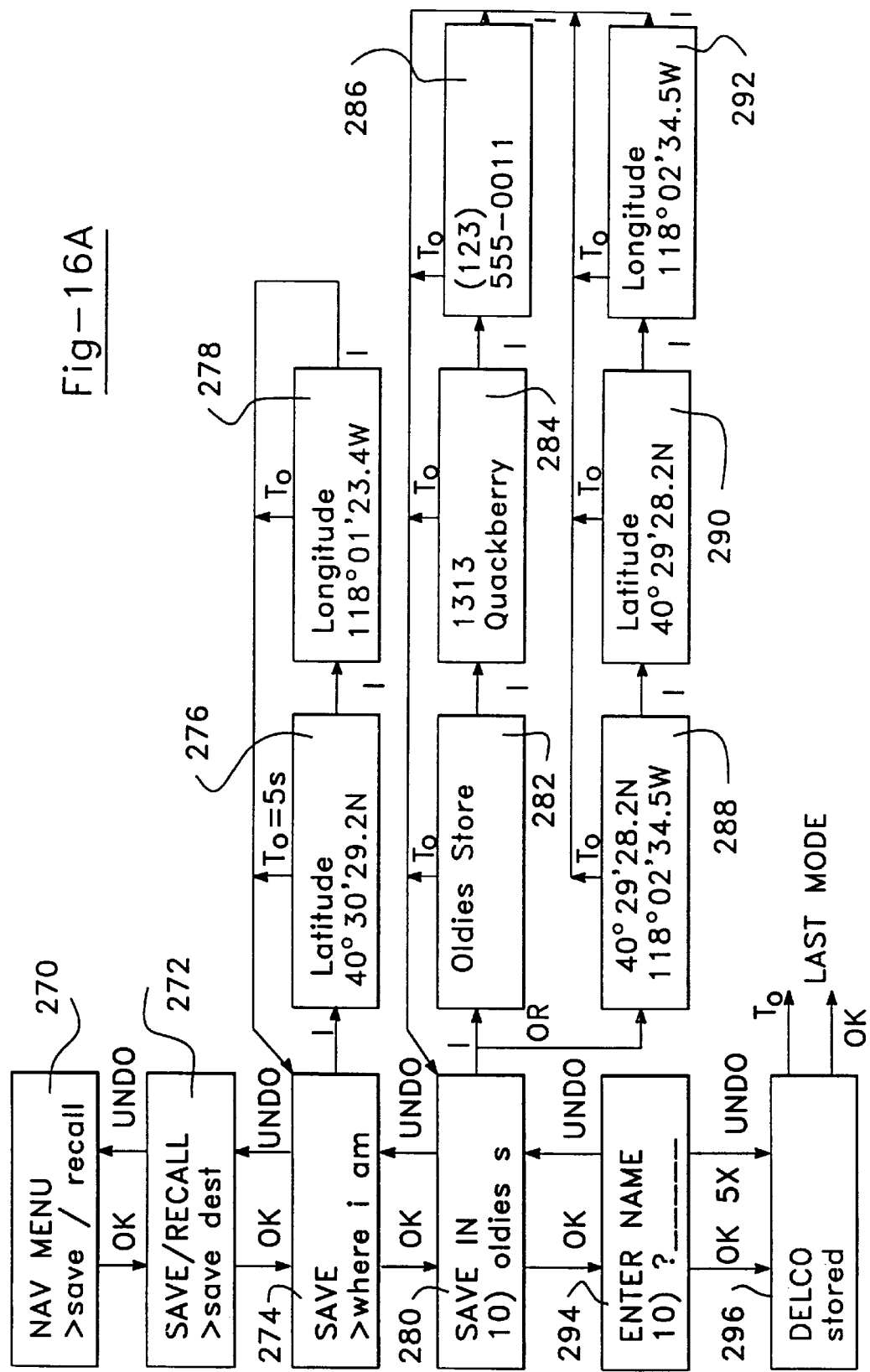

Referring now to the save/recall menu operation, key sequences and displays are shown in FIGS. 16A through 16E for illustrative purposes. Referring to FIG. 16A, the key sequences and displays are shown when saving the current "where I am" user position as a destination. Beginning with display block 270, the navigation menu shows selection of the save/recall menu. Depression of menu choices rotary pushbutton 16 advances to display block 272 which displays the save destination category. Selection of the save destination category advances to display block 274 where the user may select the "where I am" selection for saving the current position in the user programmable memory. To check the current position, a user may depress information pushbutton 20 to view the current latitude position coordinates in display block 276 and the current longitude position coordinates in display block 278.

To save the current position coordinates, the menu choices rotary pushbutton 16 is depressed to advance to display block 280. In display block 280, the user may select which programmable memory location to use to store the current position as a user selectable destination. By depressing information pushbutton 20, the user may display information pertaining to the old destination stored in a currently shown memory location. For example, display blocks 282, 284 and 286 may be viewed so a user may determine whether to copy the current position over the old location information. Alternately, information pertaining to old coordinates as shown in display blocks 288, 290 and 292 may be viewed.

Once a user selects the desired memory location, a descriptive name may be entered to identify the current position being saved. Verification of the stored name is provided in display block 296 and the navigation system 10 returns to the last navigation mode.

Key sequencing and displays for storing a user selected destination as the last entry is illustrated in FIG. 16B. The save/recall menu selection and save destination categories are selected as shown in display blocks 270 and 272. Referring to display block 298, a user may select to save the last entered destination, shown here as "Burger Hut". Depression of information pushbutton 20 provides additional information as shown in display blocks 300, 302 and 304.

To save the last entered destination, menu choices rotary pushbutton 16 is depressed to advance to display block 280 to select the user programmable memory location in which to save the last destination entry. Similarly, information pertaining to an old entry for a currently shown memory location may be viewed by depressing the information pushbutton 20 to proceed to display blocks 282 through 292. The desired memory location is selected and the current destination last entered is saved in the corresponding memory location as shown in display block 306. The navigation system 10 thereafter returns to the last mode.

Figure 16C:
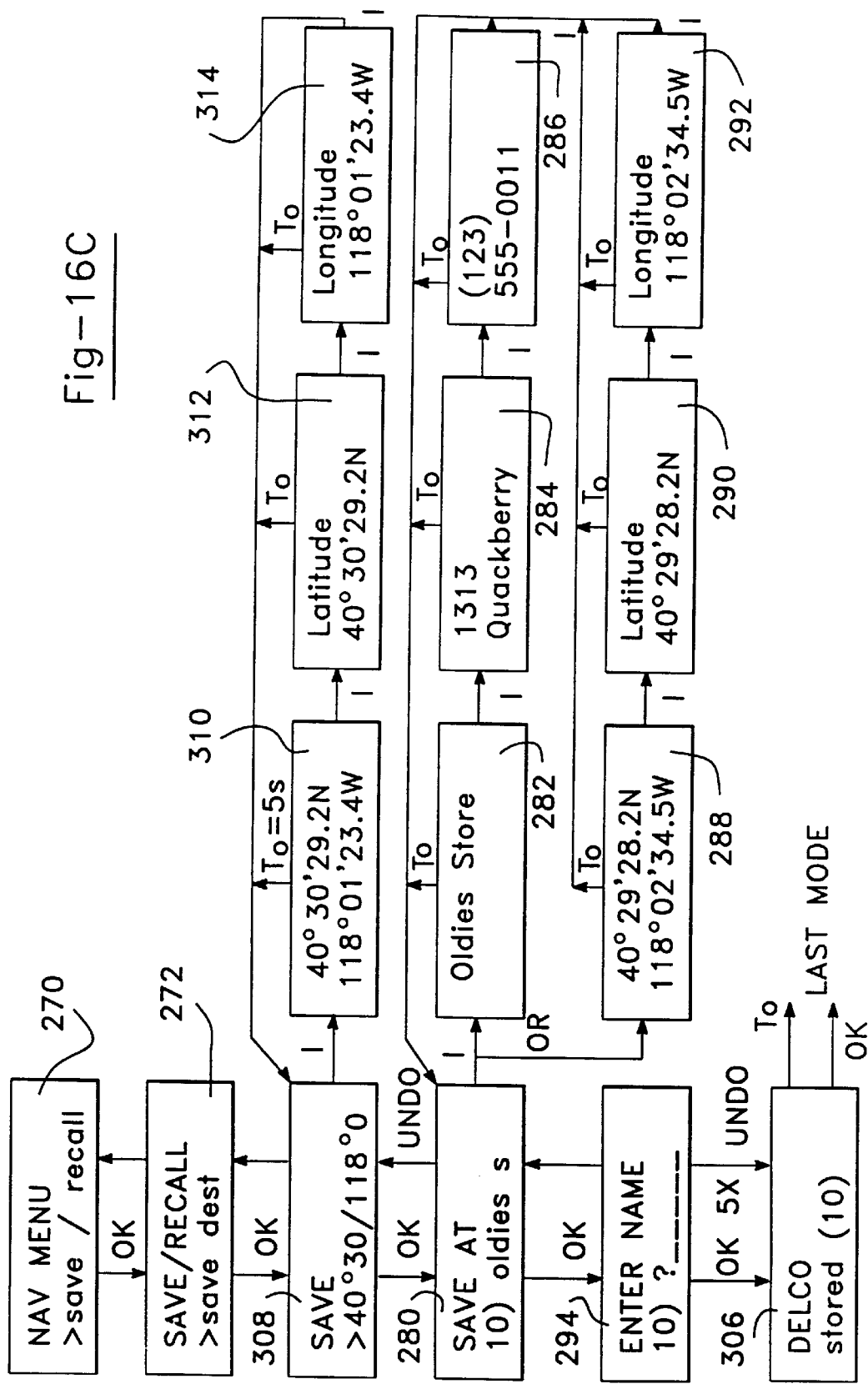

Key sequences and displays are shown in FIG. 16C when storing a user destination last entered by latitude and longitude position coordinates. The save/recall menu and save destination category are selected as shown by display blocks 270 and 272. With the save category selected, the last entered destination may be saved with the latitude and longitude position coordinates as shown in display block 308. The latitude and longitude position coordinates for the last entered destination may be viewed as shown in display blocks 310, 312 and 314. To save the current latitude and longitude position coordinates, the menu choices rotary pushbutton 16 is depressed to advance to the display block 280 and destination storage in a user programmable memory location is achieved as described in connection with FIGS. 16A and 16B.

Figure 16D:
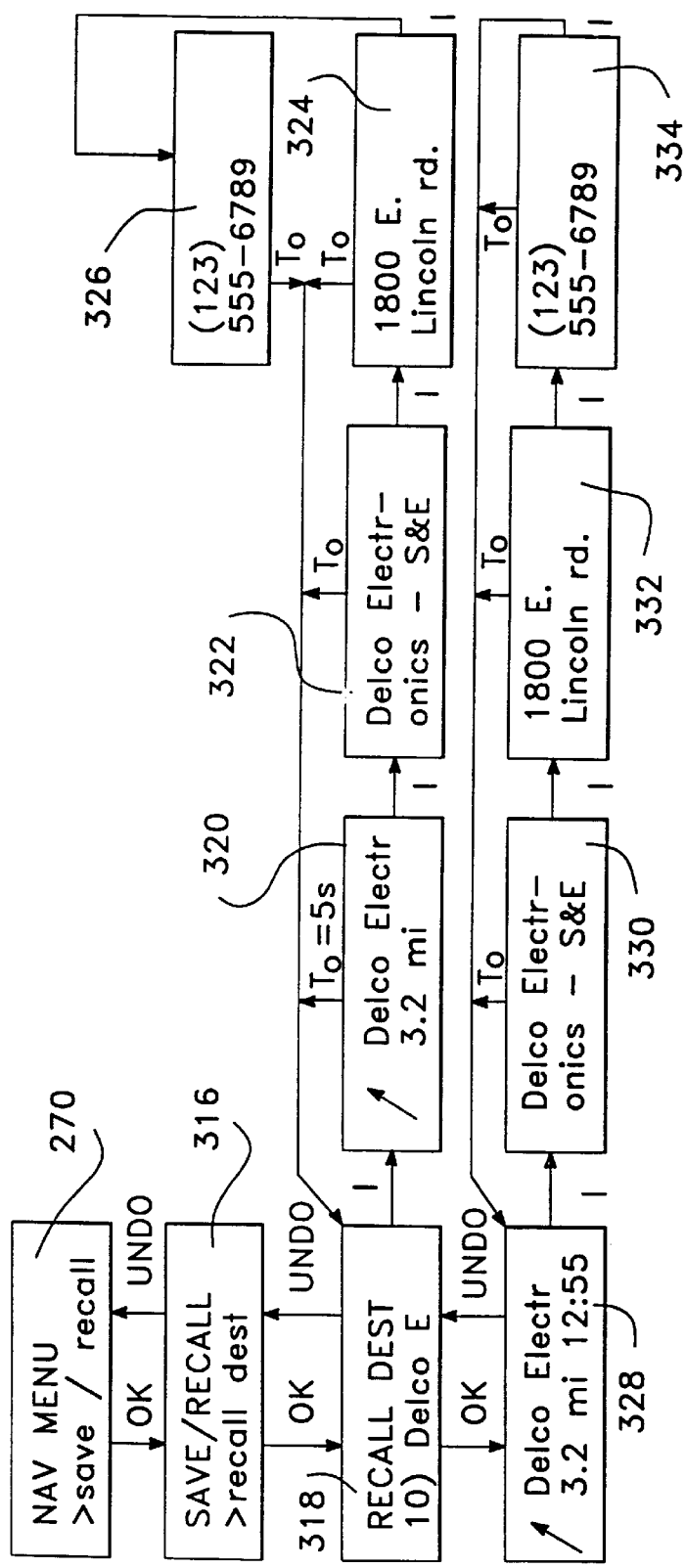
Figure 16E:
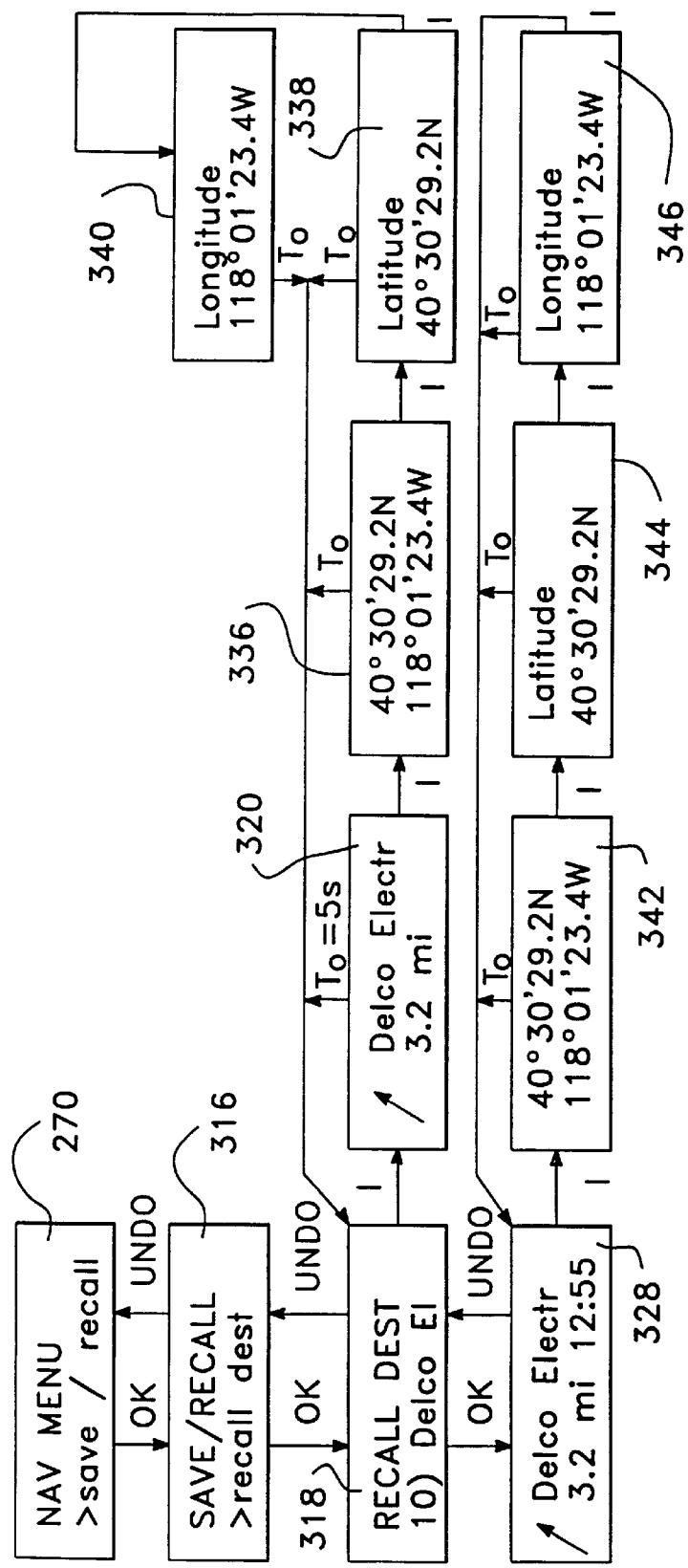

Referring to FIGS. 16D and 16E, key sequences and displays are shown for recalling user stored destinations. In FIG. 16D, user stored destinations are recalled from the user programmable memory locations which were previously stored from the destination data base in the memory card. With the save/recall menu selected in block 270, the recall destination category 140 is selected as shown in display block 316. The recall destination category allows for sequencing through a predetermined number of available memory locations. By rotating the menu choices rotary pushbutton 16, user may view destination names given to the individual memory locations. Within each destination name, additional destination information may be viewed by depressing the information pushbutton 20 as shown in display blocks 320, 322, 324 and 326. Once a particular memory location is selected, the destination name, direction pointing arrow to the destination and distance to the destination is shown on display 30 as provided by display block 328. Information pushbutton allows for viewing of additional information corresponding to the selected destination and as provided in display blocks 330, 332 and 334.

Finally, referring to FIG. 16E, stored destinations which were previously stored as latitude and longitude position coordinates are now recalled under the recall destination category. Recalling the desired destination is achieved in a manner similar to that described in connection with 16D. However, the information provided with regard to each of the selectable destinations provides the latitude and longitude position coordinates as shown in display blocks 336, 338, 340 and also in display blocks 342, 344 and 346.

It should be understood that the navigation system 10 of the present invention advantageously provides low cost and easy to use navigation services for assisting a user in reaching a desired destination. The navigation system 10 is a tool for assisting a user to reach a destination, while allowing a user to independently make decisions on the appropriate route to reach the destination. While the navigation system 10 is described in connection with an automotive vehicle for assisting the driver thereof, it should be understood that the navigation system 10 is applicable for a wide variety of applications which generally require travel to reach a desired destination.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

The embodiments of the invention in which an exclusive property or privilege is claimed are defined as follows:

What is claimed is:

1. A navigation system with authorization access control for accessing navigation information, said system comprising:

a housing having a global positioning system (GPS) receiver which normally operates on a first set of predetermined destination navigation data;

a memory in the housing for storing a user identification code assigned to the navigation system from a pool of possible user identification codes so that different navigation systems contain different user identification codes;

a data carrier having a second set of navigation data stored therein, said second set of navigation data being different from the first set and being capable of being used by the GPS receiver to provide additional navigation information for the system, said data carrier also having an identification code stored therein; and processor means in the housing for comparing the identification code of the data carrier with the user identification code of the navigation system and allowing access by said processor to the second set of navigation data on the data carrier when the data identification code matches the user identification code wherein said GPS receiver receives GPS position signals and determines position coordinates therefrom, said GPS receiver further determining a time-related information, said time-related information being compared with a preprogrammed period of time to control access to the second set of navigational data on the data carrier.

2. The navigation system as defined in claim 1 wherein said navigation information is encrypted and said navigation system further comprises decryption means for decrypting said encrypted information.

3. The navigation system as defined in claim 2 wherein said identification code is integrated within the encrypted information.

4. The navigation system as defined in claim 1 wherein the housing is mounted in a vehicle.

5. The navigation system as defined in claim 1 wherein the housing further comprising a memory card interface and wherein the data carrier comprises a memory card for storing the second set of navigation data and the identification code.

6. The navigation system as defined in claim 1 wherein said second set of navigational data and identification code are accessed via an online data provider and stored on the data carrier.

7. The navigation system as defined in claim 1 wherein the housing includes a timer for limiting access to the second set of navigational data for a preprogrammed period of time stored in the data carrier.

8. A method of controlling data access with a navigation system, said method comprising the steps of:

assigning a user identification code to a receiver of a (GPS) navigation system from a plurality of possible user identification codes so that different navigation systems have different user identification codes;

providing stored data information on a portable data carrier that can be used with the navigation system;

assigning a data identification code to the stored data information;

comparing the data identification code with the user identification code;

allowing authorized access to the data information on the data carrier when the data identification code matches the user identification code;

receiving GPS position signals from the GPS navigation system and determining position coordinates therefrom; and receiving time-related information from the GPS navigation system and comparing said time-related information with a preprogrammed period of time to control access to the data information on the data carrier.

9. The method as defined in claim 8 further comprising the steps of encrypting the data information and decrypting accessed data information with the navigation system.

10. A method of controlling access to navigational data for use in a mobile vehicle navigation system, said method comprising:

downloading navigational information data from an on-line data provider;

storing the navigational information data into a memory on a portable memory card, together with a data identification code provided by the on-line data provider;

storing a user identification code in a housing containing a memory card interface and a GPS navigational receiver;

mounting the housing in the vehicle;

inserting the memory card into the memory card interface;

comparing the data identification code on the memory card with the user identification code in the housing;

selectively allowing access to the navigational information data on the memory card as a function of the comparison between the data identification code and the user identification code;

receiving GPS position signals in the GPS navigational receiver and determining position coordinates therefrom; and receiving time-related information in the navigational receiver and comparing said time-related information with a preprogrammed period of time to control access to the navigational information data on the memory card.

* * * * *